United States Patent
Li et al.

(10) Patent No.: US 11,736,355 B2
(45) Date of Patent: Aug. 22, 2023

(54) NETWORK CONFIGURATION METHOD AND COMMUNICATIONS APPARATUS

(71) Applicant: Huawei Technologies Co., Ltd., Shenzhen (CN)

(72) Inventors: Huan Li, Shanghai (CN); Weisheng Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 17/118,867

(22) Filed: Dec. 11, 2020

(65) Prior Publication Data

US 2021/0099351 A1    Apr. 1, 2021

Related U.S. Application Data

(63) Continuation of application No. PCT/CN2019/090066, filed on Jun. 5, 2019.

(30) Foreign Application Priority Data

Jun. 12, 2018   (CN) .......................... 201810603514.4

(51) Int. Cl.
*H04L 41/0893*   (2022.01)
*H04L 12/66*   (2006.01)
(Continued)

(52) U.S. Cl.
CPC .......... *H04L 41/0893* (2013.01); *H04L 12/66* (2013.01); *H04L 61/5014* (2022.05); *H04L 61/5076* (2022.05)

(58) Field of Classification Search
CPC . H04L 41/0893; H04L 12/66; H04L 61/2015; H04L 61/2076; H04L 29/12; H04L 41/0886
See application file for complete search history.

(56) References Cited

U.S. PATENT DOCUMENTS

2006/0120305 A1   6/2006   Van Den Bosch et al.
2009/0292794 A1   11/2009   Ding et al.
(Continued)

FOREIGN PATENT DOCUMENTS

CN   101064714 A   10/2007
CN   101247297 A   8/2008
(Continued)

OTHER PUBLICATIONS

"3rd Generation Partnership Project;Technical Specification Group Services and System Aspects; Study on the Wireless and Wireline Convergence for the 5G system architecture (Release 16)", Apr. 27, 2018, XP051437411, 59 pages.
(Continued)

*Primary Examiner* — Nicholas R Taylor
*Assistant Examiner* — Sanjoy Roy
(74) *Attorney, Agent, or Firm* — Conley Rose, P.C.

(57) ABSTRACT

A configuration serving network element may configure information about the configuration serving network element for a fifth generation (5G) network architecture. A terminal device may obtain the information about the configuration serving network element from the 5G network architecture. The information about the configuration serving network element includes address information of the configuration serving network element. Therefore, the terminal device can establish a connection to the configuration serving network element based on the address information of the configuration serving network element, so that the configuration serving network element can automatically configure the terminal device by using the 5G network architecture.

20 Claims, 12 Drawing Sheets

(51) Int. Cl.
*H04L 61/5014* (2022.01)
*H04L 61/5076* (2022.01)

(56) References Cited

U.S. PATENT DOCUMENTS

| | | |
|---|---|---|
| 2010/0039958 A1 | 2/2010 | Ge et al. |
| 2011/0103374 A1* | 5/2011 | Lajoie .................. H04L 65/612 |
| | | 370/352 |
| 2012/0115479 A1 | 5/2012 | Ehrenholm et al. |
| 2012/0127975 A1 | 5/2012 | Yang et al. |
| 2014/0283099 A1 | 9/2014 | Smith et al. |
| 2015/0372973 A1* | 12/2015 | Lopez Da Silva . H04L 12/4641 |
| | | 370/254 |
| 2016/0183229 A1 | 6/2016 | Nakai |
| 2016/0294575 A1 | 10/2016 | Ding et al. |
| 2017/0031777 A1 | 2/2017 | Wang et al. |
| 2019/0116081 A1* | 4/2019 | Gerodolle ........... H04L 61/2575 |
| 2019/0273669 A1* | 9/2019 | Boucadair ........... H04L 41/0816 |
| 2020/0163012 A1* | 5/2020 | Zhu ....................... H04W 12/08 |

FOREIGN PATENT DOCUMENTS

| | | |
|---|---|---|
| CN | 101296203 A | 10/2008 |
| CN | 103428022 A | 12/2013 |
| CN | 104079685 A | 10/2014 |
| EP | 1850527 A1 | 10/2007 |
| RU | 2576482 C2 | 3/2016 |

OTHER PUBLICATIONS

Huawei et al., "SG-RG configuration and management", 3GPP Draft: S2-1902376, Mar. 1, 2019, 5 pages.

3GPP TS 23.501 V15.1.0 "3rd Generation Partnership Project; Technical Specification Group Services and System Aspects; System Architecture for the 5G System; Stage 2 (Release 15)," Mar. 2018, 201 pages.

3GPP TS 23.502 V15.1.0, (Mar. 2018), "3rd Generation Partnership Project; Technical Specification Group Services and System Aspects; Procedures for the 5G System; Stage 2 (Release 15)," Mar. 2018, 285 pages.

Huawei, et al., "Solution to Support IPTV Service," SA WG2 Meeting #127: S2-184153, Apr. 23, 2018, 8 pages.

Huawei, et al., "Update KI #7 on Policy," 3GPP TSG SA WG2 Meeting #125, S2-180574, Jan. 22-26, 2018, Gothenburg, Sweden, 2 pages.

* cited by examiner

NETWORK CONFIGURATION METHOD AND COMMUNICATIONS APPARATUS

CROSS-REFERENCE TO RELATED APPLICATION

This application is a continuation of International Patent Application No. PCT/CN2019/090066 filed on Jun. 5, 2019, which claims priority to Chinese Patent Application No. 201810603514.4 filed on Jun. 12, 2018. The disclosure of the aforementioned applications are hereby incorporated by reference in their entireties.

TECHNICAL FIELD

Embodiments of this application relate to the field of communications technologies, and in particular, to a network configuration method and a communications apparatus.

BACKGROUND

The 3rd generation partnership project (3GPP) specification group released a fifth-generation (5G) network architecture. The 5G network architecture supports a residential gateway (RG) in accessing a 5G core network through a radio access network or a fixed broadband access network, and then accessing a data network connected to the 5G core network. In other approaches, the RG may obtain an address of a configuration platform in a fixed network through the Dynamic Host Configuration Protocol (DHCP) protocol. However, in addition to providing an access service of the data network for the RG, a DHCP server in the 5G core network may further provide an access service of the data network for a device of another operator, or an operator to which the 5G core network belongs and an operator to which the RG belongs are not a same operator. Consequently, the RG cannot be automatically configured by using the existing 5G network architecture.

SUMMARY

Embodiments of this application provide a network configuration method and a communications apparatus, to resolve a technical problem that an RG cannot be automatically configured by using an existing 5G network architecture.

According to a first aspect, an embodiment of this application provides a network configuration method. The method may be applied to a terminal device, or may be applied to a chip in a terminal device. The following describes the method by using an example in which the method is applied to a terminal device. The method includes sending a request message to a core network element, where the request message is used to obtain information about a configuration serving network element, and the information about the configuration serving network element includes address information of the configuration serving network element, and receiving a response message from the core network element, where the response message includes the information about the configuration serving network element.

According to the network configuration method provided in the first aspect, the information about the configuration serving network element is configured in a 5G network architecture, so that the terminal device can obtain the information about the configuration serving network element from the 5G network architecture. The information about the configuration serving network element includes the address information of the configuration serving network element. In this way, the terminal device can establish a connection to the configuration serving network element based on the address information of the configuration serving network element, so that the configuration serving network element can automatically configure the terminal device by using the 5G network architecture. Therefore, the terminal device can be automatically configured by using the existing 5G network architecture.

In a possible implementation, the request message includes an identifier of the terminal device and/or first indication information, and the first indication information is used to request to obtain the information about the configuration serving network element.

According to the network configuration method provided in this possible implementation, the terminal device may indicate, by using the identifier of the terminal device and/or the first indication information, that the request message is used to obtain the information about the configuration serving network element, so that manners in which the terminal device requests to obtain the information about the configuration serving network element are flexible and diverse, expanding use scenarios.

In a possible implementation, the first indication information is an identifier of a data network to be accessed by the terminal device.

According to the network configuration method provided in this possible implementation, the identifier of the data network to be accessed by the terminal device is used as the first indication information to reduce signaling overheads of the request message.

In a possible implementation, the core network element is an access management network element, the request message is a registration request message, and the response message is a registration accept message, the core network element is a session management network element, the request message is a session establishment request message, and the response message is a session establishment response message, or the core network element is a session management network element, the request message is an access request message for requesting to access the data network, and the response message is a feedback message for the access request message.

According to the network configuration method provided in this possible implementation, the terminal device may obtain, through a registration procedure, a session establishment procedure, or an access procedure for accessing the data network, the information about the configuration serving network element corresponding to the terminal device from the 5G network architecture, so that the manners in which the terminal device requests to obtain the information about the configuration serving network element are flexible and diverse, expanding the use scenarios.

In a possible implementation, the method further includes receiving a configuration update message from the access management network element, where the configuration update message is used to instruct to update the information about the configuration serving network element, and the configuration update message includes update information of the configuration serving network element, and updating the locally-stored information about the configuration serving network element based on the update information of the configuration serving network element.

According to the network configuration method provided in this possible implementation, when updating the information about the configuration serving network element, the terminal device may obtain, from the 5G network architecture by using the configuration information update message, the update information of the configuration serving network element corresponding to the terminal device. This manner can ensure accuracy of the information about the configuration serving network element that is stored in the terminal device. Subsequently, the terminal device may establish the connection to the configuration serving network element based on the address information of the configuration serving network element that is carried in the accurate information about the configuration serving network element, so that the configuration serving network element can automatically configure the terminal device by using the 5G network architecture, improving efficiency of automatic configuration.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

According to the network configuration method provided in this possible implementation, when updating the information about the configuration serving network element, the terminal device may perform a corresponding update operation based on the second indication information in the configuration information update message and the update information of the configuration serving network element, so that update manners of the information about the configuration serving network element are flexible and diverse, expanding the use scenarios.

According to a second aspect, an embodiment of this application provides a network configuration method. The method may be applied to a core network element, or a chip in a core network element. The core network element herein may be a configuration network element, for example, a unified data repository (UDR) network element, a data management network element (for example, a unified data management (UDM) network element), a policy control network element (for example, a policy control function (PCF) network element), or a DHCP server, or a core network element connected to a configuration network element. The following describes the method by using an example in which the method is applied to a core network element. The method includes receiving a request message from a core network element, where the request message is used to obtain information about a configuration serving network element, and the information about the configuration serving network element includes address information of the configuration serving network element, obtaining the information about the configuration serving network element based on the request message, and sending a response message to the core network element, where the response message includes the information about the configuration serving network element.

According to the network configuration method provided in the second aspect, the information about the configuration serving network element may be provided for a terminal device based on the request message from the terminal device by using another core network element. In this way, the terminal device can establish a connection to the configuration serving network element based on the address information of the configuration serving network element, so that the configuration serving network element can automatically configure the terminal device by using a 5G network architecture. Therefore, the terminal device can be automatically configured by using the existing 5G network architecture.

In a possible implementation, the request message includes an identifier of a terminal device and/or first indication information, and the first indication information is used to request to obtain the information about the configuration serving network element.

According to the network configuration method provided in this possible implementation, the identifier of the terminal device and/or the first indication information may be used to indicate that the request message is used to obtain the information about the configuration serving network element, so that manners of requesting to obtain the information about the configuration serving network element are flexible and diverse, expanding use scenarios.

In a possible implementation, the first indication information is an identifier of a data network to be accessed by the terminal device.

According to the network configuration method provided in this possible implementation, the identifier of the data network to be accessed by the terminal device is used as the first indication information to reduce signaling overheads of the request message.

In a possible implementation, the request message includes the identifier of the terminal device, and the obtaining the information about the configuration serving network element based on the request message includes determining, based on the identifier of the terminal device, an identifier of an operator to which the configuration serving network element belongs, and obtaining the information about the configuration serving network element based on the identifier of the operator to which the configuration serving network element belongs.

According to the network configuration method provided in this possible implementation, when the core network element is a configuration network element, information about a configuration serving network element that belongs to a same operator as the terminal device may be obtained based on the identifier of the terminal device, to ensure accuracy of the obtained information about the configuration serving network element.

In a possible implementation, the core network element is any one of the following network elements a data management network element, a policy control network element, a session management network element, and an access management network element.

According to the network configuration method provided in this possible implementation, the terminal device may obtain, from the 5G network architecture by using the data management network element, the policy control network element, the session management network element, or the access management network element in the 5G network architecture, the information about the configuration serving network element corresponding to the terminal device, so that manners in which the terminal device obtains the information about the configuration serving network element from the 5G network architecture are flexible and diverse, expanding the use scenarios.

In a possible implementation, the method further includes receiving a configuration request message from a network exposure network element or a UDR network element, where the configuration request message includes the information about the configuration serving network element, and processing the information about the configuration serving network element based on the configuration request message.

According to the network configuration method provided in this possible implementation, the configuration request message is received to correspondingly process, for example, store, forward, delete, or update, the information about the configuration serving network element. In this manner, the information about the configuration serving network element can be flexibly configured in the 5G network architecture, expanding the use scenarios.

In a possible implementation, the processing the information about the configuration service platform based on the configuration request message includes storing the information about the configuration serving network element based on the configuration request message.

In a possible implementation, the configuration request message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

According to the network configuration method provided in this possible implementation, a corresponding update operation may be performed on the information about the configuration serving network element based on the second indication information in the configuration request message configuration serving network element. In this manner, the information about the configuration serving network element can be flexibly configured in the 5G network architecture, expanding the use scenarios.

In a possible implementation, the processing the information about the configuration service platform based on the configuration request message includes sending the configuration request message to a data management network element or a policy control network element.

In a possible implementation, the processing the information about the configuration serving network element based on the configuration request message includes processing the information about the configuration serving network element based on the second indication information.

According to the network configuration method provided in this possible implementation, the corresponding update operation may be performed on information about the configuration serving network element based on the second indication information in the configuration request message. In this manner, the information about the configuration serving network element can be flexibly configured in the 5G network architecture, expanding the use scenarios.

In a possible implementation, the method further includes sending a configuration update message to an access management network element, where the configuration update message is used to instruct to update the information about the configuration serving network element, and the configuration update message includes update information of the configuration serving network element.

According to the network configuration method provided in this possible implementation, when the information about the configuration serving network element is updated, the access management network element forwards the configuration information update message to the terminal device, so that the terminal device can obtain, from the 5G network architecture, the update information of the configuration serving network element corresponding to the terminal device. This manner can ensure accuracy of the information about the configuration serving network element that is stored in the terminal device. Subsequently, the terminal device may establish the connection to the configuration serving network element based on the address information of the configuration serving network element that is carried in the accurate information about the configuration serving network element, so that the configuration serving network element can automatically configure the terminal device by using the 5G network architecture, improving efficiency of automatic configuration.

In a possible implementation, the configuration information update message further includes the second indication information.

According to the network configuration method provided in this possible implementation, when updating the information about the configuration serving network element, the terminal device may perform a corresponding update operation based on the second indication information in the configuration information update message and the update information of the configuration serving network element, so that update manners of the information about the configuration serving network element are flexible and diverse, expanding the use scenarios.

According to a third aspect, an embodiment of this application provides a network configuration method. The method may be applied to a core network element, or a chip in a core network element. The core network element herein may be, for example, an access management network element (for example, an access and mobility management Function (AMF) network element) or a session management network element (for example, a session management function (SMF) network element). The following describes the method by using an example in which the method is applied to a core network element. The method includes obtaining information about a configuration serving network element corresponding to a terminal device, and sending a response message to the terminal device, where the response message includes the information about the configuration serving network element, and the information about the configuration serving network element includes address information of the configuration serving network element.

According to the network configuration method provided in the third aspect, the information about the configuration serving network element corresponding to the terminal device is obtained from a 5G network architecture and is added to the response message, and the response message is sent to the terminal device, so that the terminal device can obtain the information about the configuration serving network element from the 5G network architecture. The information about the configuration serving network element includes the address information of the configuration serving network element. In this way, the terminal device can establish a connection to the configuration serving network element based on the address information of the configuration serving network element, so that the configuration serving network element can automatically configure the terminal device by using the 5G network architecture. Therefore, the terminal device can be automatically configured by using the existing 5G network architecture.

In a possible implementation, before the obtaining information about a configuration service platform, the method further includes receiving a request message from the terminal device, where the request message is used to obtain the information about the configuration serving network element.

According to the network configuration method provided in this possible implementation, after receiving the request message from the terminal device, the core network element may obtain, from the 5G network architecture, the information about the configuration serving network element corresponding to the terminal device, add the information about the configuration serving network element to the response message, and send the response message to the terminal device, so that manners in which the terminal device obtains the information about the configuration serving network element are flexible and diverse, expanding use scenarios.

In a possible implementation, after the obtaining information about a configuration service platform, the method further includes receiving a request message from the terminal device, where the request message is used to obtain the information about the configuration serving network element.

According to the network configuration method provided in this possible implementation, before receiving the request message from the terminal device, the core network element may obtain, from the 5G network architecture, the information about the configuration serving network element corresponding to the terminal device, add the information about the configuration serving network element to the response message after receiving the request message from the terminal device, and send the response message to the terminal device, so that manners in which the terminal device obtains the information about the configuration serving network element are flexible and diverse, expanding use scenarios.

In a possible implementation, the request message includes an identifier of the terminal device and/or first indication information, and the first indication information is used to request to obtain the information about the configuration serving network element.

According to the network configuration method provided in this possible implementation, the identifier of the terminal device and/or the first indication information may be used to indicate that the request message is used to obtain the information about the configuration serving network element, so that manners in which the terminal device requests to obtain the information about the configuration serving network element are flexible and diverse, expanding the use scenarios.

In a possible implementation, the obtaining information about a configuration serving network element includes sending a request message to a data management network element, where the request message is used to obtain the information about the configuration serving network element, and receiving a response message from the data management network element, where the response message includes the information about the configuration serving network element, or sending the request message to a policy control network element, and receiving the response message from the policy control network element, or sending the request message to a DHCP server, and receiving the response message from the DHCP server.

According to the network configuration method provided in this possible implementation, the information about the configuration serving network element corresponding to the terminal device may be obtained from the 5G network architecture through a registration procedure, a session establishment procedure, or an access procedure for accessing a data network, so that the manners of obtaining the information about the configuration serving network element are flexible and diverse, expanding the use scenarios.

In a possible implementation, the request message includes the identifier of the terminal device and/or the first indication information.

According to the network configuration method provided in this possible implementation, the identifier of the terminal device and/or the first indication information may be used to indicate that the request message is used to obtain the information about the configuration serving network element, so that the manners in which the terminal device requests to obtain the information about the configuration serving network element are flexible and diverse, expanding the use scenarios.

In a possible implementation, the method further includes receiving a configuration update message from a core network element, where the configuration update message is used to instruct to update the information about the configuration serving network element, and the configuration update message includes update information of the configuration serving network element, and sending the configuration information update message to the terminal device.

According to the network configuration method provided in this possible implementation, when the information about the configuration serving network element is updated, the configuration information update message is forwarded to the terminal device, so that the terminal device can obtain, from the 5G network architecture, the update information of the configuration serving network element corresponding to the terminal device. This manner can ensure accuracy of the information about the configuration serving network element that is stored in the terminal device. Subsequently, the terminal device may establish the connection to the configuration serving network element based on the address information of the configuration serving network element that is carried in the accurate information about the configuration serving network element, so that the configuration serving network element can automatically configure the terminal device by using the 5G network architecture, improving efficiency of automatic configuration.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

According to the network configuration method provided in this possible implementation, a corresponding update operation may be performed on information about the configuration serving network element based on the second indication information in the configuration update message. In this manner, the information about the configuration serving network element can be flexibly configured in the 5G network architecture, expanding the use scenarios.

According to a fourth aspect, an embodiment of this application provides a network configuration method. The method may be applied to a network exposure network element (for example, a network exposure function (NEF) network element), or a chip in a network exposure network element. The following describes the method by using an example in which the method is applied to a network exposure network element. The method includes receiving a configuration request message from a configuration serving network element, where the configuration request message includes information about the configuration serving network element, and the information about the configuration serving network element includes address information of the configuration serving network element, and sending the configuration request message to a core network element, where the core network element is any one of the following network elements a UDR network element, a data management network element, a policy control network element, and a DHCP server.

According to the network configuration method provided in the fourth aspect, the configuration serving network element configures, for a 5G network architecture by using the network exposure network element in the 5G network architecture, the information about the configuration serving network element corresponding to a terminal device, so that the terminal device can subsequently obtain the information about the configuration serving network element from the 5G network architecture. In this way, the terminal device can establish a connection to the configuration serving network element based on the address information of the configuration serving network element, so that the configuration serving network element can automatically configure the terminal device by using the 5G network architecture. Therefore, the terminal device can be automatically configured by using the existing 5G network architecture.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

According to the network configuration method provided in this possible implementation, a configuration network element in the 5G network architecture may perform a corresponding update operation on information about the configuration serving network element based on the indication information in the configuration request message. In this manner, the information about the configuration serving network element can be flexibly configured in the 5G network architecture, expanding use scenarios.

In a possible implementation, the configuration request message further includes an identifier of an operator to which the configuration serving network element belongs and/or an identifier of the configuration serving network element, and the method further includes performing authentication on the configuration serving network element based on the identifier of the operator to which the configuration serving network element belongs and/or the identifier of the configuration serving network element, and the sending the configuration request message to a core network element includes sending the configuration request message to the core network element after the authentication on the configuration serving network element succeeds.

According to the network configuration method provided in this possible implementation, further, after receiving the configuration request message, the network exposure network element may first perform authentication on the configuration serving network element based on the identifier of the operator to which the configuration serving network element belongs and/or the identifier of the configuration serving network element, to determine whether the configuration serving network element has permission to configure the information about the configuration serving network element for the 5G network architecture. In this implementation, the network exposure network element may send the configuration request message to the core network element after the authentication on the configuration serving network element succeeds. In this manner, an unauthorized configuration serving network element in a data network can be prevented from configuring the information about the configuration serving network element for the 5G network architecture.

In a possible implementation, the information about the configuration serving network element further includes an identifier of a data network, where the data network is a network to which a session used by the terminal device to receive configuration information from the configuration serving network element belongs.

According to the network configuration method provided in this possible implementation, the identifier of the data network to be accessed by the terminal device is carried in the information about the configuration serving network element. In this way, after subsequently obtaining the information about the configuration serving network element from the 5G network architecture, the terminal device can quickly establish, based on the identifier of the data network when establishing the connection to the configuration serving network element based on the address information of the configuration serving network element, the session used to receive the configuration information from the configuration serving network element. In this way, the configuration serving network element can transmit the configuration information to the terminal device by using the session, to automatically configure the terminal device, improving efficiency of automatically configuring the terminal device.

According to a fifth aspect, an embodiment of this application provides a network configuration method. The method may be applied to a configuration serving network element (for example, an auto-configuration server (ACS)), or a chip in a configuration serving network element. The following describes the method by using an example in which the method is applied to a configuration serving network element. The method includes generating a configuration request message, where the configuration request message includes information about the configuration serving network element, and the information about the configuration serving network element includes address information of the configuration serving network element, and sending the configuration request message to a network exposure network element.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the configuration request message further includes at least one of the following an identifier of an operator to which the configuration serving network element belongs and an identifier of the configuration serving network element.

In a possible implementation, the information about the configuration serving network element further includes an identifier of a data network, where the data network is a network to which a session used by a terminal device to receive configuration information from the configuration serving network element belongs.

For beneficial effects of the network configuration method provided in the fifth aspect and the possible implementations of the fifth aspect, refer to the beneficial effects brought by the fourth aspect and the possible implementations of the fourth aspect, and details are not described herein again.

According to a sixth aspect, an embodiment of this application provides a network configuration method. The method may be applied to a core network element, or a chip in a core network element. The core network element herein may be a configuration network element, for example, a UDR network element, a data management network element (for example, a UDM network element), a policy control network element (for example, a PCF network element), or a DHCP server, or a core network element connected to a configuration network element. The following describes the method by using an example in which the method is applied to a core network element. The method includes receiving a configuration request message from a network exposure network element or a UDR network element, where the configuration request message includes information about a configuration serving network element, and the information about the configuration serving network element includes address information of the configuration serving network element, and processing the information about the configuration serving network element based on the configuration request message.

In a possible implementation, the processing the information about the configuration service platform based on the configuration request message includes storing the information about the configuration serving network element based on the configuration request message.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the processing the information about the configuration service platform based on the configuration request message includes sending the configuration request message to a data management network element or a policy control network element.

In a possible implementation, the processing the information about the configuration serving network element based on the configuration request message includes processing the information about the configuration serving network element based on the indication information.

In a possible implementation, the method further includes sending a configuration information update message to an access management network element, where the configuration information update message is used to instruct to update the information about the configuration serving network element, and the configuration update message includes update information of the configuration serving network element.

In a possible implementation, the configuration information update message further includes the indication information.

For beneficial effects of the network configuration method provided in the sixth aspect and the possible implementations of the sixth aspect, refer to the beneficial effects brought by the second aspect and the possible implementations of the second aspect, and details are not described herein again.

According to a seventh aspect, an embodiment of this application provides a communications apparatus. The apparatus includes a sending unit, configured to send a request message to a core network element, where the request message is used to obtain information about a configuration serving network element, and the information about the configuration serving network element includes address information of the configuration serving network element, and a receiving unit, configured to receive a response message from the core network element, where the response message includes the information about the configuration serving network element.

In a possible implementation, the request message includes an identifier of a terminal device and/or first indication information, and the first indication information is used to request to obtain the information about the configuration serving network element.

In a possible implementation, the first indication information is an identifier of a data network to be accessed by the terminal device.

In a possible implementation, the core network element is an access management network element, the request message is a registration request message, and the response message is a registration accept message, the core network element is a session management network element, the request message is a session establishment request message, and the response message is a session establishment response message, or the core network element is a session management network element, the request message is an access request message for requesting to access the data network, and the response message is a feedback message for the access request message.

In a possible implementation, the apparatus further includes a processing unit, the receiving unit is further configured to receive a configuration update message from the access management network element, where the configuration update message is used to instruct to update the information about the configuration serving network element, and the configuration update message includes update information of the configuration serving network element, and the processing unit is configured to update the locally-stored information about the configuration serving network element based on the update information of the configuration serving network element.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

For beneficial effects of the communications apparatus provided in the seventh aspect and the possible implementations of the seventh aspect, refer to the beneficial effects brought by the first aspect and the possible implementations of the first aspect, and details are not described herein again.

According to an eighth aspect, an embodiment of this application provides a communications apparatus. The apparatus includes a receiving unit, configured to receive a request message from a core network element, where the request message is used to obtain information about a configuration serving network element, and the information about the configuration serving network element includes address information of the configuration serving network element, a processing unit, configured to obtain the information about the configuration serving network element based on the request message, and a sending unit, configured to send a response message to the core network element, where the response message includes the information about the configuration serving network element.

In a possible implementation, the request message includes an identifier of a terminal device and/or first indication information, and the first indication information is used to request to obtain the information about the configuration serving network element.

In a possible implementation, the first indication information is an identifier of a data network to be accessed by the terminal device.

In a possible implementation, the request message includes the identifier of the terminal device, and the processing unit is further configured to determine, based on the identifier of the terminal device, an identifier of an operator to which the configuration serving network element belongs, and obtain the information about the configuration serving network element based on the identifier of the operator to which the configuration serving network element belongs.

In a possible implementation, the core network element is any one of the following network elements a data management network element, a policy control network element, a session management network element, and an access management network element.

In a possible implementation, the receiving unit is further configured to receive a configuration request message from a network exposure network element or a UDR network element, where the configuration request message includes the information about the configuration serving network element, and the processing unit is further configured to process the information about the configuration serving network element based on the configuration request message.

In a possible implementation, the processing unit is further configured to store the information about the configuration serving network element based on the configuration request message.

In a possible implementation, the configuration request message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the processing unit is further configured to send the configuration request message to a data management network element or a policy control network element by using the sending unit.

In a possible implementation, the processing unit is further configured to process the information about the configuration serving network element based on the second indication information.

In a possible implementation, the sending unit is further configured to send a configuration update message to an access management network element, where the configuration update message is used to instruct to update the information about the configuration serving network element, and the configuration update message includes update information of the configuration serving network element.

In a possible implementation, the configuration information update message further includes the second indication information.

For beneficial effects of the communications apparatus provided in the eighth aspect and the possible implementations of the eighth aspect, refer to the beneficial effects brought by the second aspect and the possible implementations of the second aspect, and details are not described herein again.

According to a ninth aspect, an embodiment of this application provides a communications apparatus. The apparatus includes a processing unit, configured to obtain information about a configuration serving network element corresponding to a terminal device, and a sending unit, configured to send a response message to the terminal device, where the response message includes the information about the configuration serving network element, and the information about the configuration serving network element includes address information of the configuration serving network element.

In a possible implementation, the apparatus further includes a receiving unit, configured to, before the processing unit obtains information about a configuration service platform, receive a request message from the terminal device, where the request message is used to obtain the information about the configuration serving network element.

In a possible implementation, the apparatus further includes a receiving unit, configured to, after the obtaining unit obtains information about a configuration service platform, receive a request message from the terminal device, where the request message is used to obtain the information about the configuration serving network element.

In a possible implementation, the request message includes an identifier of the terminal device and/or first indication information, and the first indication information is used to request to obtain the information about the configuration serving network element.

In a possible implementation, the processing unit is further configured to send a request message to a data management network element by using the sending unit, and receive, by using the receiving unit, a response message from the data management network element, where the request message is used to obtain the information about the configuration serving network element, and the response message includes the information about the configuration serving network element, the processing unit is further configured to send the request message to a policy control network element by using the sending unit, and receive, by using the receiving unit, the response message from the policy control network element, or the processing unit is further configured to send the request message to a DHCP server by using the sending unit, and receive, by using the receiving unit, the response message from the DHCP server.

In a possible implementation, the request message includes the identifier of the terminal device and/or the first indication information.

In a possible implementation, the apparatus further includes a receiving unit, configured to receive a configuration update message from a core network element, where the configuration update message is used to instruct to update the information about the configuration serving network element, and the configuration update message includes update information of the configuration serving network element, and the sending unit is further configured to send the configuration information update message to the terminal device.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

For beneficial effects of the communications apparatus provided in the ninth aspect and the possible implementations of the ninth aspect, refer to the beneficial effects brought by the third aspect and the possible implementations of the third aspect, and details are not described herein again.

According to a tenth aspect, an embodiment of this application provides a communications apparatus. The apparatus includes a receiving unit, configured to receive a configuration request message from a configuration serving network element, where the configuration request message includes information about the configuration serving network element, and the information about the configuration serving network element includes address information of the configuration serving network element, and a sending unit, configured to send the configuration request message to a core network element, where the core network element is any one of the following network elements a UDR network element, a data management network element, a policy control network element, and a DHCP server.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the configuration request message further includes an identifier of an operator to which the configuration serving network element belongs and/or an identifier of the configuration serving network element, and the apparatus further includes a processing unit, configured to perform authentication on the configuration serving network element based on the identifier of the operator to which the configuration serving network element belongs and/or the identifier of the configuration serving network element, and the sending unit is further configured to send the configuration request message to the core network element after the authentication on the configuration serving network element succeeds.

In a possible implementation, the information about the configuration serving network element further includes an identifier of a data network, where the data network is a network to which a session used by a terminal device to receive configuration information from the configuration serving network element belongs.

For beneficial effects of the communications apparatus provided in the tenth aspect and the possible implementations of the tenth aspect, refer to the beneficial effects brought by the fourth aspect and the possible implementations of the fourth aspect, and details are not described herein again.

According to an eleventh aspect, an embodiment of this application provides a communications apparatus. The apparatus includes a processing unit, configured to generate a configuration request message, where the configuration request message includes information about a configuration serving network element, and the information about the configuration serving network element includes address information of the configuration serving network element, and a sending unit, configured to send the configuration request message to a network exposure network element.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the configuration request message further includes at least one of the following an identifier of an operator to which the configuration serving network element belongs and an identifier of the configuration serving network element.

In a possible implementation, the information about the configuration serving network element further includes an identifier of a data network, where the data network is a network to which a session used by a terminal device to receive configuration information from the configuration serving network element belongs.

For beneficial effects of the communications apparatus provided in the eleventh aspect and the possible implementations of the eleventh aspect, refer to the beneficial effects brought by the fifth aspect and the possible implementations of the fifth aspect, and details are not described herein again.

According to a twelfth aspect, an embodiment of this application provides a communications apparatus. The apparatus includes a receiving unit, configured to receive a configuration request message from a network exposure network element or a UDR network element, where the configuration request message includes information about a configuration serving network element, and the information about the configuration serving network element includes address information of the configuration serving network element, and a processing unit, configured to process the information about the configuration serving network element based on the configuration request message.

In a possible implementation, the processing unit is further configured to store the information about the configuration serving network element based on the configuration request message.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the apparatus further includes a sending unit, and the processing unit is further configured to send the configuration request message to a data management network element or a policy control network element by using the sending unit.

In a possible implementation, the processing unit is further configured to process the information about the configuration serving network element based on the indication information.

In a possible implementation, the apparatus further includes a sending unit, and the processing unit is further configured to send a configuration information update message to an access management network element by using the sending unit, where the configuration information update message is used to instruct to update the information about the configuration serving network element, and the configuration update message includes update information of the configuration serving network element.

In a possible implementation, the configuration information update message further includes the indication information.

For beneficial effects of the communications apparatus provided in the twelfth aspect and the possible implementations of the twelfth aspect, refer to the beneficial effects brought by the sixth aspect and the possible implementations of the sixth aspect, and details are not described herein again.

According to a thirteenth aspect, an embodiment of this application provides a communications apparatus. The communications apparatus includes a processor, a memory, a receiver, and a transmitter. Both the receiver and the transmitter are coupled to the processor, and the processor controls a receiving action of the receiver and a sending action of the transmitter.

The memory is configured to store computer-executable program code, and the program code includes an instruction. When the processor executes the instruction, the instruction enables the communications apparatus to perform the network configuration method according to the first aspect or the possible implementations of the first aspect.

According to a fourteenth aspect, an embodiment of this application provides a communications apparatus. The communications apparatus includes a processor and a memory.

The memory is configured to store computer-executable program code, and the program code includes an instruction. When the processor executes the instruction, the instruction enables the communications apparatus to perform the network configuration method according to the second aspect or the possible implementations of the second aspect.

According to a fifteenth aspect, an embodiment of this application provides a communications apparatus. The communications apparatus includes a processor and a memory.

The memory is configured to store computer-executable program code, and the program code includes an instruction. When the processor executes the instruction, the instruction enables the communications apparatus to perform the network configuration method according to the third aspect or the possible implementations of the third aspect.

According to a sixteenth aspect, an embodiment of this application provides a communications apparatus. The communications apparatus includes a processor and a memory.

The memory is configured to store computer-executable program code, and the program code includes an instruction. When the processor executes the instruction, the instruction enables the communications apparatus to perform the network configuration method according to the fourth aspect or the possible implementations of the fourth aspect.

According to a seventeenth aspect, an embodiment of this application provides a communications apparatus. The communications apparatus includes a processor and a memory.

The memory is configured to store computer-executable program code, and the program code includes an instruction. When the processor executes the instruction, the instruction enables the communications apparatus to perform the network configuration method according to the fifth aspect or the possible implementations of the fifth aspect.

According to an eighteenth aspect, an embodiment of this application provides a communications apparatus. The communications apparatus includes a processor and a memory.

The memory is configured to store computer-executable program code, and the program code includes an instruction. When the processor executes the instruction, the instruction enables the communications apparatus to perform the network configuration method according to the sixth aspect or the possible implementations of the sixth aspect.

According to a nineteenth aspect, an embodiment of this application provides a communications apparatus, including units, modules, or circuits configured to perform the method according to the first aspect or the possible implementations of the first aspect. The communications apparatus may be a terminal device, or may be a module applied to a terminal device, for example, a chip applied to a terminal device.

According to a twentieth aspect, an embodiment of this application provides a communications apparatus, including units, modules, or circuits configured to perform the method according to the second aspect or the possible implementations of the second aspect. The communications apparatus may be a core network element, or may be a module applied to a core network element, for example, a chip applied to a core network element. The core network element may be a configuration network element, for example, a UDR network element, a data management network element (for example, a UDM network element), a policy control network element (for example, a PCF network element), or a DHCP server, or a core network element connected to a configuration network element.

According to a twenty-first aspect, an embodiment of this application provides a communications apparatus, including units, modules, or circuits configured to perform the method according to the third aspect or the possible implementations of the third aspect. The communications apparatus may be a core network element, or may be a module applied to a core network element, for example, a chip applied to a core network element. The core network element herein may be, for example, an access management network element (for example, an AMF network element) or a session management network element (for example, an SMF network element).

According to a twenty-second aspect, an embodiment of this application provides a communications apparatus, including units, modules, or circuits configured to perform the method according to the fourth aspect or the possible implementations of the fourth aspect. The communications apparatus may be a network exposure network element (for example, an NEF network element), or may be a module applied to a network exposure network element, for example, a chip applied to a network exposure network element.

According to a twenty-third aspect, an embodiment of this application provides a communications apparatus, including units, modules, or circuits configured to perform the method according to the fifth aspect or the possible implementations of the fifth aspect. The communications apparatus may be a configuration serving network element (for example, an ACS), or may be a module applied to a configuration serving network element, for example, a chip applied to a configuration serving network element.

According to a twenty-fourth aspect, an embodiment of this application provides a communications apparatus, including units, modules, or circuits configured to perform the method according to the sixth aspect or the possible implementations of the sixth aspect. The communications apparatus may be a core network element, or may be a module applied to a core network element, for example, a chip applied to a core network element. The core network element herein may be a configuration network element, for example, a UDR network element, a data management network element (for example, a UDM network element), a policy control network element (for example, a PCF network element), or a DHCP server, or a core network element connected to a configuration network element.

According to a twenty-fifth aspect, an embodiment of this application provides a computer program product including an instruction. When the computer program product is run on a computer, the computer is enabled to perform the method according to the first aspect or the possible implementations of the first aspect.

According to a twenty-sixth aspect, an embodiment of this application provides a computer program product including an instruction. When the computer program product is run on a computer, the computer is enabled to perform the method according to the second aspect or the possible implementations of the second aspect.

According to a twenty-seventh aspect, an embodiment of this application provides a computer program product including an instruction. When the computer program product is run on a computer, the computer is enabled to perform the method according to the third aspect or the possible implementations of the third aspect.

According to a twenty-eighth aspect, an embodiment of this application provides a computer program product including an instruction. When the computer program product is run on a computer, the computer is enabled to perform the method according to the fourth aspect or the possible implementations of the fourth aspect.

According to a twenty-ninth aspect, an embodiment of this application provides a computer program product including an instruction. When the computer program product is run on a computer, the computer is enabled to perform the method according to the fifth aspect or the possible implementations of the fifth aspect.

According to a thirtieth aspect, an embodiment of this application provides a computer program product including an instruction. When the computer program product is run on a computer, the computer is enabled to perform the method according to the sixth aspect or the possible implementations of the sixth aspect.

According to a thirty-first aspect, an embodiment of this application provides a computer-readable storage medium. The computer-readable storage medium stores an instruction, when the instruction is run on a computer, the computer is enabled to perform the method according to the first aspect or the possible implementations of the first aspect.

According to a thirty-second aspect, an embodiment of this application provides a computer-readable storage medium. The computer-readable storage medium stores an instruction, when the instruction is run on a computer, the computer is enabled to perform the method according to the second aspect or the possible implementations of the second aspect.

According to a thirty-third aspect, an embodiment of this application provides a computer-readable storage medium. The computer-readable storage medium stores an instruction, when the instruction is run on a computer, the computer is enabled to perform the method according to the third aspect or the possible implementations of the third aspect.

According to a thirty-fourth aspect, an embodiment of this application provides a computer-readable storage medium. The computer-readable storage medium stores an instruction, when the instruction is run on a computer, the computer is enabled to perform the method according to the fourth aspect or the possible implementations of the fourth aspect.

According to a thirty-fifth aspect, an embodiment of this application provides a computer-readable storage medium. The computer-readable storage medium stores an instruction, when the instruction is run on a computer, the computer is enabled to perform the method according to the fifth aspect or the possible implementations of the fifth aspect.

According to a thirty-sixth aspect, an embodiment of this application provides a computer-readable storage medium. The computer-readable storage medium stores an instruction, when the instruction is run on a computer, the computer is enabled to perform the method according to the sixth aspect or the possible implementations of the sixth aspect.

According to the network configuration methods and the communications apparatuses that are provided in the embodiments of this application, the configuration serving network element may configure the information about the configuration serving network element for the 5G network architecture, so that the terminal device can obtain the information about the configuration serving network element from the 5G network architecture. The information about the configuration serving network element includes the address information of the configuration serving network element. In this way, the terminal device can establish the connection to the configuration serving network element based on the address information of the configuration serving network element, so that the configuration serving network element can automatically configure the terminal device by using the 5G network architecture.

DESCRIPTION OF EMBODIMENTS

Figure 1:
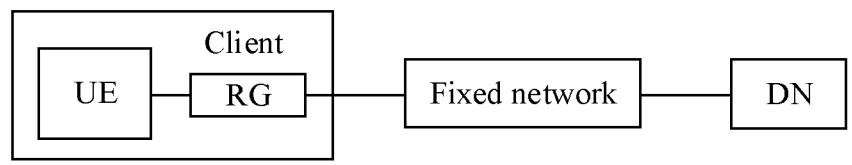
FIG. 1 is a diagram of an existing network architecture in which a terminal device accesses a data network.

FIG. 1 is a diagram of a network architecture in which a terminal device accesses a data network. As shown in FIG. 1, an RG may access the data network through a fixed network to obtain a data service. Therefore, a user may access the data network through the RG by using a user equipment (UE) (for example, a mobile phone or a tablet computer), to obtain the data service. The RG and the fixed network belong to a same operator. An ACS is configured in the data network. The RG may establish, through the fixed network based on address information of the ACS, a connection to the ACS of the operator, so that the ACS can transmit configuration information to the RG through the connection and automatically configure the RG. Before establishing the connection to the ACS, the RG needs to perform an ACS discovery process to obtain the address information of the ACS. Currently, the RG may obtain the address information of the ACS by interacting with a DHCP server in the data network.

Figure 2:
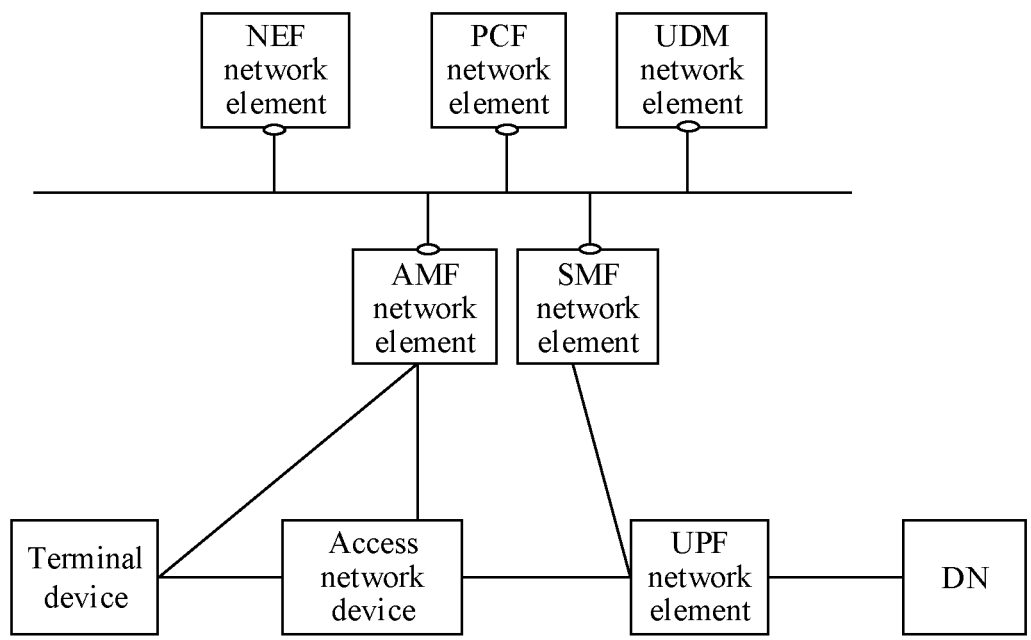
FIG. 2 is a diagram of a network architecture in the embodiments of this application.

FIG. 2 is a diagram of a network architecture in the embodiments of this application. As shown in FIG. 2, a 5G network architecture released by the 3GPP specification group includes an access network device, a user plane function (UPF) network element, an AMF network element, a SMF network element, a PCF network element, a UDM network element, a NEF network element, and a DHCP server. A person skilled in the art may understand that the 5G network architecture shown in FIG. 2 does not constitute a limitation on the 5G network architecture. During specific implementation, the 5G network architecture may include more or fewer network elements than those shown in the figure, some network elements may be combined, and so on.

In the 5G network architecture, the access network device is a device on a side of an access network, and the AMF network element, the SMF network element, the PCF network element, the UDM network element, the NEF network element, and the DHCP server are network elements on a side of a core network (which are referred to as core network elements for short). The access network herein may be a radio access network or a fixed broadband access network. Therefore, the 5G network architecture may also be referred to as a fixed-mobile convergence architecture. In some embodiments, the DHCP server may alternatively be independent of the core network in the 5G network architecture, that is, the DHCP server may belong to the core network, or may not belong to the core network.

The terminal device may access, by using the 5G network architecture, a data network connected to the core network in the 5G network architecture. The terminal device herein may be a set top box (STB), an RG, customer premises equipment (CPE), a terminal device in the Internet of things (IoT), a computer with wireless transmission and reception functions, a wireless terminal device in a smart home, or the like. The data network herein may be any network, for example, the Internet, an Internet Protocol (IP) television (IPTV) network, or an IP multimedia subsystem (IMS) network, that can provide a data service for a user. The terminal device may alternatively include UE. For example, the terminal device is UE in FIG. 1. In the embodiments of this application, the data network is a third-party network relative to the 5G network architecture. In a possible implementation, the terminal device and an ACS belong to a same operator. The ACS can automatically configure a terminal device that establishes a connection to the ACS.

Specifically, the access network device is configured to connect the terminal device to the core network. When an access network corresponding to the access network device is a fixed broadband access network, the access network device may be a fixed access gateway function (FAGF) network element in the fixed broadband access network. When an access network corresponding to the access network device is a radio access network, the access network device may be a radio access network device. The radio access network device herein is an access device wirelessly connecting the terminal device to the 5G network architecture, and for example, may be a network-side NodeB, a network-side eNodeB, a network side in a 5G mobile communications system, a network side in a future mobile communications system, or an access node in a WI-FI system. A specific technology and a specific device form that are used by the radio access network device are not limited in the embodiments of this application. It should be noted that if the access network corresponding to the access network device is the fixed broadband access network, the terminal device may alternatively communicate with the core network elements in the 5G network architecture by using a fixed-mobile interworking function (FMIF) network element in the fixed broadband access network.

The AMF network element is configured to manage whether the terminal device can access the core network. The SMF network element is configured to manage a session connection established by the terminal device over the core network, and each session connection is used to transmit user plane data of the terminal device. The UPF network element is configured to transmit the user plane data. The PCF network element is configured to provide a policy, for example, a quality of service (QoS) policy, that is used by the terminal device to access the core network. The UDM network element is configured to store subscription data of the terminal device. The NEF network element is a network exposure network element in the 5G network architecture. A third-party network device may invoke an application programming interface (API) provided by the operator, to subscribe to an event from a 5G system by using the NEF. The DHCP server is configured to provide, for the terminal device, an access service of the data network connected to the core network in the 5G network architecture.

Using an example in which the terminal device is an RG, as described above, the 5G network architecture shown in FIG. 2 supports the RG in accessing the 5G core network through the radio access network or the fixed broadband access network, and then accessing the data network connected to the 5G core network. However, in addition to providing the access service of the data network for the RG, the DHCP server in the 5G core network may further provide an access service of the data network for a terminal device of another operator, or an operator to which the 5G core network belongs and the operator to which the RG belongs are not a same operator. Consequently, the RG cannot be automatically configured by using the existing 5G network architecture.

The embodiments of this application provide a network configuration method. Information about a configuration serving network element may be configured for a 5G network architecture, so that a terminal device can obtain the information about the configuration serving network element from the 5G network architecture. The information about the configuration serving network element includes address information of the configuration serving network element. In this way, the terminal device can establish a connection to the configuration serving network element based on the address information of the configuration serving network element, so that the configuration serving network element can automatically configure the terminal device by using the 5G network architecture. In a possible implementation, the configuration serving network element and the terminal device belong to a same operator. It may be understood in the art that the method provided in the embodiments of this application includes but is not limited to a scenario in which an RG accesses a data network by using the 5G network architecture. The method provided in the embodiments of this application may be used in all scenarios in which the terminal device accesses the data network by using the 5G network architecture shown in FIG. 2.

Based on the 5G network architecture shown in FIG. 2, the following describes in detail the method in the embodiments of this application by using some embodiments. The following several embodiments may be combined with each other, and a same or similar concept or process may not be described repeatedly in some embodiments.

Figure 3:
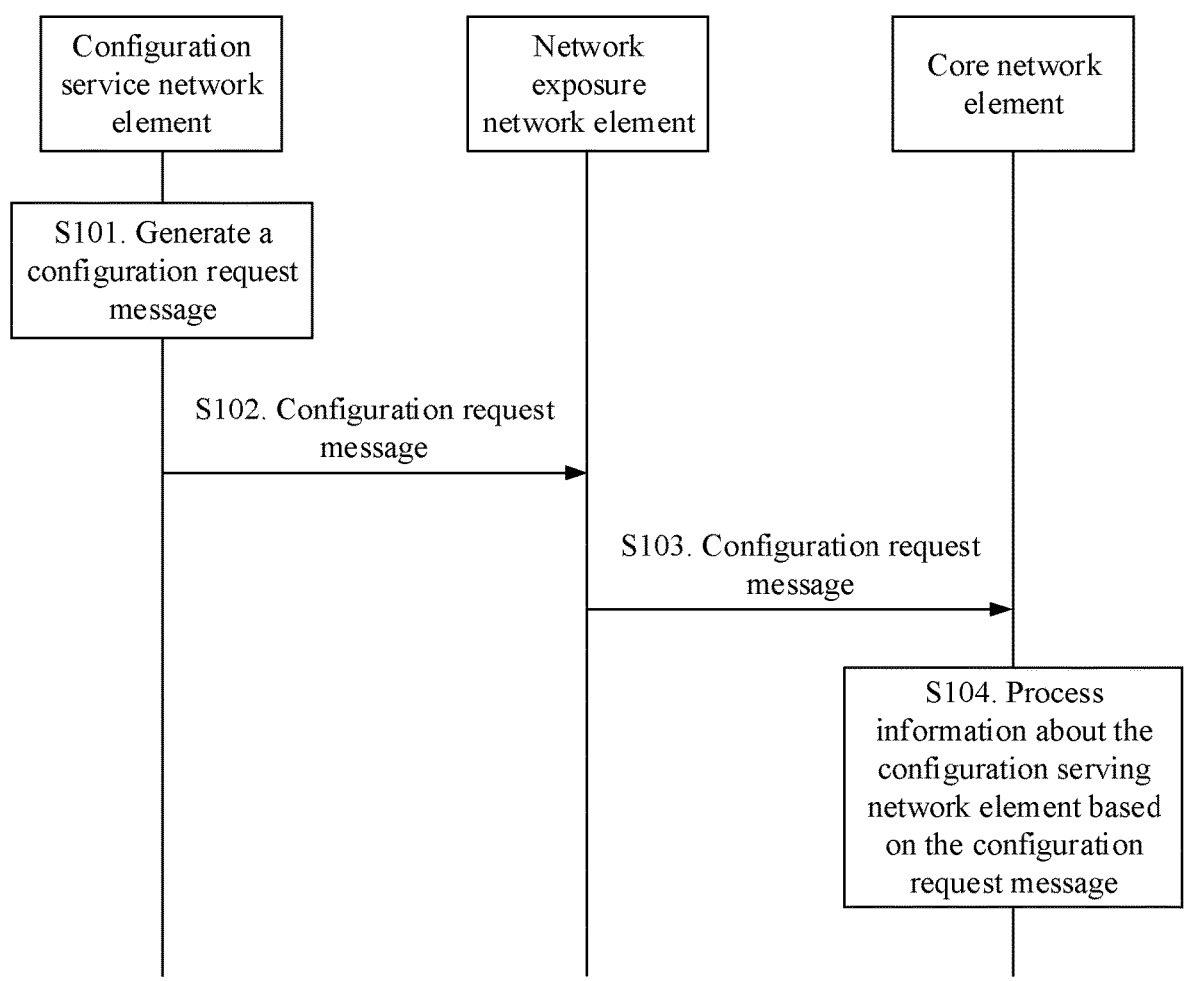
FIG. 3 is a flowchart of a network configuration method according to an embodiment of this application.

FIG. 3 is a flowchart of a network configuration method according to an embodiment of this application. This embodiment relates to a specific process in which a configuration serving network element configures information about the configuration serving network element for a 5G network architecture. Network elements in this embodiment include the configuration serving network element (for example, an ACS), a network exposure network element (for example, an NEF network element) that is in the 5G network architecture and that interacts with an external network, and a core network element in the 5G network architecture. As shown in FIG. 3, the method includes the following steps.

S101. The configuration serving network element generates a configuration request message.

The configuration request message includes the information about the configuration serving network element, and the information about the configuration serving network element includes address information of the configuration serving network element.

S102. The configuration serving network element sends the configuration request message to the network exposure network element.

Correspondingly, the network exposure network element may receive the configuration request message.

S103. The network exposure network element sends the configuration request message to the core network element.

S104. The core network element processes the information about the configuration serving network element based on the configuration request message.

Specifically, the configuration serving network element in a data network may generate the configuration request message carrying the information about the configuration serving network element. The information about the configuration serving network element includes the address information of the configuration serving network element, for example, a uniform resource locator (URL) of the configuration serving network element and/or an IP address of the configuration serving network element. After generating the configuration request message, the configuration serving network element may send the configuration request message to the network exposure network element that is in the 5G network architecture and that is configured to interact with the external network, to configure the information about the configuration serving network element for the 5G network architecture. For example, the configuration serving network element may send the configuration request message to the network exposure network element by invoking an API of the network exposure network element.

After receiving the configuration request message, the network exposure network element may send the configuration request message to the core network element on a side of a core network. The core network element herein may be a core network element for configuring the information about the configuration serving network element (where the core network element for configuring the information about the configuration serving network element is referred to as a configuration network element for short) in the 5G network architecture, and may be, for example, any one of the following network elements a UDR network element, a data management network element (for example, a UDM network element), a policy control network element (for example, a PCF network element), or a DHCP server. Alternatively, the core network element may be a core network element connected to a configuration network element. For example, the configuration network element is a data management network element (for example, a UDM network element) or a policy control network element (for example, a PCF network element), and the core network element connected to the configuration network element is a UDR network element. It may be understood that, if there are a plurality of DHCP servers in the 5G network architecture, and each DHCP server corresponds to one or more operators, the network exposure network element may forward the configuration request message to a DHCP server corresponding to an operator to which the configuration serving network element belongs.

When the core network element is a configuration network element, after receiving the configuration request message from the network exposure network element, the core network element may store, based on the configuration request message, the information about the configuration serving network element that is carried in the configuration request message. In a possible implementation, the configuration request message may further include first indication information, and the first indication information is used to indicate an operation on the information about the configuration serving network element. The operation includes any one of the following newly adding the information about the configuration serving network element, modifying the information about the configuration serving network element, and deleting the information about the configuration serving network element. In this implementation, the core network element may perform, based on the first indication information in the configuration request message, a corresponding operation on the information about the configuration serving network element that is carried in the configuration request message. For example, if the first indication information is used to instruct to newly add the information about the configuration serving network element, the core network element may store the information about the configuration serving network element. If the first indication information is used to instruct to modify the information about the configuration serving network element, the core network element may replace, with the information about the configuration serving network element, information about the configuration serving network element that is stored before. If the first indication information is used to instruct to delete the information about the configuration serving network element, the core network element may locally delete the information about the configuration serving network element.

When the core network element is a core network element connected to a configuration network element, after receiving the configuration request message from the network exposure network element, the core network element may send the configuration request message to the configuration network element (for example, the data management network element or the policy control network element) for processing. After receiving the configuration request message, the configuration network element may store the information about the configuration serving network element that is carried in the configuration request message. Optionally, if the configuration request message includes first indication information used to indicate an operation on the information about the configuration serving network element, the configuration network element may perform, based on the first indication information in the configuration request message, a corresponding operation on the information about the configuration serving network element that is carried in the configuration request message.

In a possible implementation, the configuration request message may further include an identifier of the operator to which the configuration serving network element belongs and/or an identifier of the configuration serving network element. Further, after receiving the configuration request message, the network exposure network element may first perform authentication on the configuration serving network element based on the identifier of the operator to which the configuration serving network element belongs and/or the identifier of the configuration serving network element, to determine whether the configuration serving network element has permission to configure the information about the configuration serving network element for the 5G network architecture. In this implementation, the network exposure network element may send the configuration request message to the core network element after the authentication on the configuration serving network element succeeds. In this manner, an unauthorized configuration serving network element in a data network can be prevented from configuring the information about the configuration serving network element for the 5G network architecture.

It may be understood that the information about the configuration serving network element may further include other information about the configuration serving network element. This is not limited in this embodiment of this application. In a possible implementation, the information about the configuration serving network element may further include an identifier of the data network, and the data network may be a network to which a session used by the terminal device to receive configuration information from the configuration serving network element belongs. In this way, after obtaining the information about the configuration serving network element from the 5G network architecture, the terminal device can quickly establish, based on the identifier of the data network when establishing a connection to the configuration serving network element based on the address information of the configuration serving network element, the session used to receive the configuration information from the configuration serving network element. In this way, the configuration serving network element can transmit the configuration information to the terminal device by using the session, to automatically configure the terminal device, improving efficiency of automatically configuring the terminal device.

In this manner, the configuration serving network element in the data network can configure the information about the configuration serving network element for the 5G network architecture.

Figure 4:
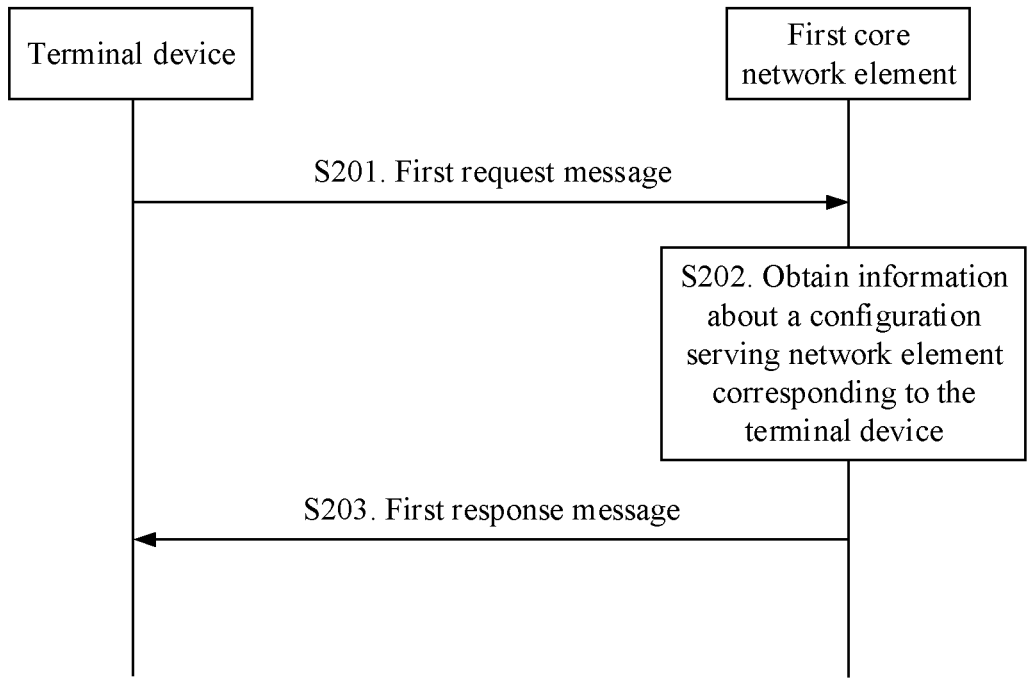
FIG. 4 is a flowchart of another network configuration method according to an embodiment of this application.

The following describes how a terminal device obtains, from a 5G network architecture, information about a configuration serving network element corresponding to the terminal device. FIG. 4 is a flowchart of another network configuration method according to an embodiment of this application. As shown in FIG. 4, the method includes the following steps.

S201. The terminal device sends a first request message to a first core network element.

The first request message is used to obtain the information about the configuration serving network element.

S202. The first core network element obtains the information about the configuration serving network element corresponding to the terminal device.

Execution orders of S201 and S202 may be changed, and FIG. 2 is a flowchart of an example in which S201 is first performed and then S202 is performed.

S203. The first core network element sends a first response message to the terminal device.

The response message includes the information about the configuration serving network element.

Specifically, the terminal device may send the request message to the first core network element, to request to obtain the information about the configuration serving network element corresponding to the terminal device. The configuration serving network element corresponding to the terminal device herein is a configuration serving network element that belongs to a same operator as the terminal device and that has permission to configure the terminal. The first core network element herein may be an access management network element (for example, an AMF network element) or a session management network element (for example, an SMF network element).

The request message may include, for example, an identifier of the terminal device and/or second indication information, and the second indication information is used to request to obtain the information about the configuration serving network element. The identifier of the terminal device herein may include at least one of the following an identifier (ID) of the terminal device, an international mobile subscriber identity (IMSI) of the terminal device, a generic public subscription identifier (GPSI) of the terminal device, a mobile station international integrated services digital network (ISDN) number (MSISDN) of the terminal device, and the like. The second indication information may be, for example, an identifier of a data network to be accessed by the terminal device, or a one-bit flag. For example, when the flag is 1, the flag is used to request to obtain the information about the configuration serving network element.

The first core network element may obtain, from a configuration network element after or before receiving the first request message from the terminal device, the information about the configuration serving network element corresponding to the terminal device, add the information about the configuration serving network element to the first response message, and send the first response message to the terminal device. In this manner, the terminal device can obtain, from the 5G network architecture, the information about the configuration serving network element corresponding to the terminal device. After obtaining the information about the configuration serving network element corresponding to the terminal device, the terminal device may establish a connection to the configuration serving network element based on address information of the configuration serving network element that is carried in the information about the configuration serving network element, so that the configuration serving network element can automatically configure the terminal device.

In a possible implementation, if the configuration network element is a data management network element (for example, a UDM network element), a policy control network element (for example, a PCF network element), a DHCP server, or the like, the first core network element may send, to the configuration network element, a second request message used to obtain the information about the configuration serving network element. The second request message may include the identifier of the terminal device and/or the second indication information. After receiving the second request message, the configuration network element may obtain the information about the configuration serving network element based on the second request message, and feed back, to the first core network element, a second response message including the information about the configuration serving network element.

For example, if the 5G network architecture provides, for a terminal device of only one operator, a service for accessing the data network, only information about a configuration serving network element of the operator is configured in the configuration network element. In this scenario, the second request message may include only the second indication information. In this way, the configuration network element can add, to the second response message based on the second indication information, the information about the configuration serving network element that is configured in the configuration network element, and send the second response message to the first core network element.

For example, if the 5G network architecture provides, for a terminal device of at least one operator, a service for accessing the data network, information about a configuration serving network element of each operator is configured in the configuration network element. In this scenario, the second request message may include the identifier of the terminal device. In this way, the configuration network element can first determine, based on the identifier of the terminal device, an identifier of an operator to which the configuration serving network element belongs, and then obtain the information about the configuration serving network element based on the identifier of the operator to which the configuration serving network element belongs. In this way, the configuration network element can add the obtained information about the configuration serving network element to the second response message, and send the second response message to the first core network element. It may be understood that the second request message may be a default request message used to obtain the information about the configuration serving network element, or the second request message may further include the second indication information used to instruct to obtain the information about the configuration serving network element, to indicate, by using the second indication information, that the second request message is used to obtain the information about the configuration serving network element.

In a possible implementation, if the configuration network element is a UDR network element, the first core network element may send a second request message to a second core network element connected to the configuration network element. After receiving the second request message, the second core network element may send, to the configuration network element, a third request message used to obtain the information about the configuration serving network element. The third request message may include the identifier of the terminal device and/or the second indication information. After receiving the third request message, the configuration network element may obtain the information about the configuration serving network element based on the third request message, and feed back, to the second core network element, a third response message including the information about the configuration serving network element. The second core network element may send, to the first core network element based on the third response message, a second response message including the information about the configuration serving network element. In this implementation, the second core network element may be, for example, a data management network element (for example, a UDM network element) or a policy control network element (for example, a PCF network element).

After the terminal device obtains, from the 5G network architecture in the foregoing manner, the information about the configuration serving network element corresponding to the terminal device, if the configuration serving network element updates the information about the configuration serving network element to the 5G network architecture by performing the procedure shown in FIG. 3, the configuration network element may further send a configuration information update message to the access management network element after updating the information about the configuration serving network element based on a configuration request message from the configuration serving network element. The configuration information update message is used to instruct to update the information about the configuration serving network element, and the configuration update message includes update information of the configuration serving network element.

After receiving the configuration update message, the access management network element may forward the configuration update message to the terminal device, so that the terminal device updates the locally-stored information about the configuration serving network element based on the configuration update message. For example, the terminal device may replace the locally-stored information about the configuration serving network element based on the update information of the configuration serving network element that is carried in the configuration update message.

In a possible implementation, if the message that is from the configuration serving network element and that is used to update the information about the configuration serving network element carries the first indication information described above, the configuration update message from the configuration network element to the terminal device by using the access management network element may also include the first indication information, so that the terminal device can perform a corresponding update operation based on the first indication information. Details are not described herein again.

The network configuration method provided in this embodiment of this application is described in detail below with reference to specific scenarios and by using an example in which the terminal device is an RG, the data management network element is a UDM network element, the policy control network element is a PCF network element, the access management network element is an AMF network element, and the session management network element is an SMF network element. Specifically, the following several scenarios may be included.

First scenario. The RG obtains the information about the configuration serving network element through a registration procedure. In this scenario, the first request message is a registration request message, and the first response message is a registration accept message.

Figure 5:
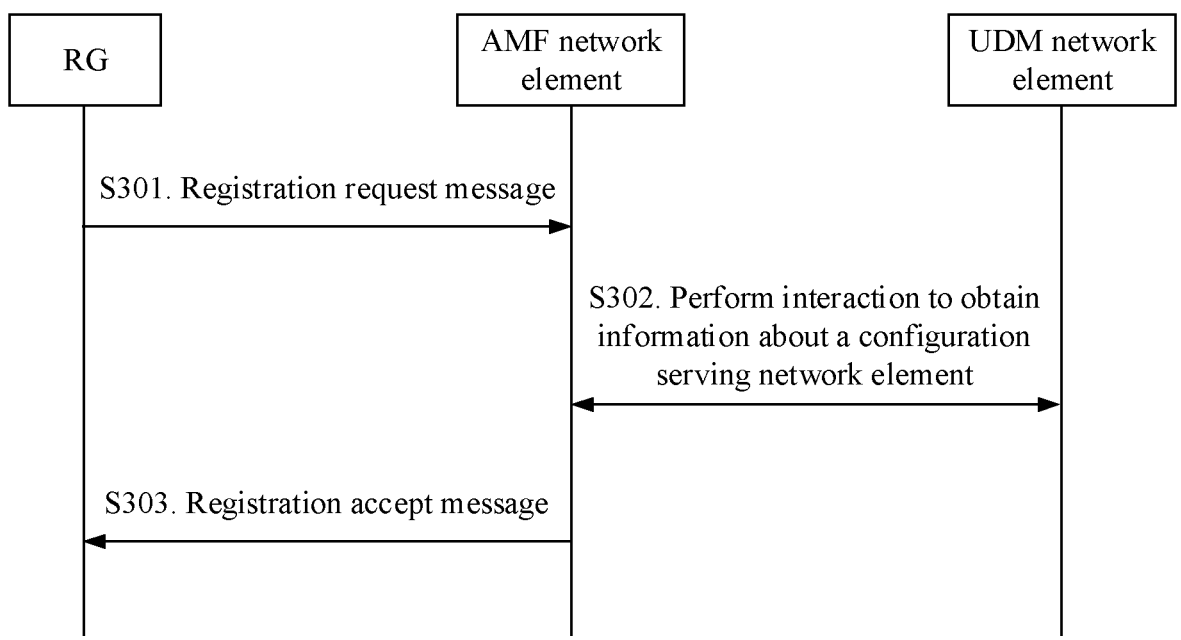
FIG. 5 is a flowchart of still another network configuration method according to an embodiment of this application.

Manner 1. The configuration network element is the UDM network element or a UDR network element. FIG. 5 is a flowchart of still another network configuration method according to an embodiment of this application. As shown in FIG. 5, the method includes the following steps.

S301. The RG sends the registration request message to the AMF network element.

The registration request message may include the identifier of the RG and/or the second indication information.

S302. The AMF network element interacts with the UDM network element to obtain the information about the configuration serving network element.

When interacting with the UDM network element to obtain subscription data of the RG, the AMF network element may send, to the UDM network element, a request message (namely, the second request message) used to obtain the subscription data of the RG. If the UDM network element is the configuration network element, the UDM network element may obtain the information about the configuration serving network element and the subscription data of the RG based on the second request message, and return, to the AMF network element, a response message that carries the information about the configuration serving network element and the subscription data of the RG.

If the UDR network element is the configuration network element, after receiving the request message (namely, the second request message) that is from the AMF network element and that is used to obtain the subscription data of the RG, the UDM network element may send, to the UDR network element, the third request message used to obtain the information about the configuration serving network element. After receiving the third request message, the UDR network element may obtain the information about the configuration serving network element based on the third request message, and feed back, to the UDM network element, the third response message including the information about the configuration serving network element. The UDM network element may return, to the AMF network element based on the third response message, a response message (the second response message) that carries the information about the configuration serving network element and the subscription data of the RG.

It may be understood that, whether the second request message and the third request message specifically include the identifier of the RG, the second indication information, or the identifier of the RG and the second indication information may be determined based on the registration request message.

S303. The AMF network element sends the registration accept message to the RG.

The registration accept message includes the information about the configuration serving network element.

After S303 is performed, the procedure ends.

Figure 6:
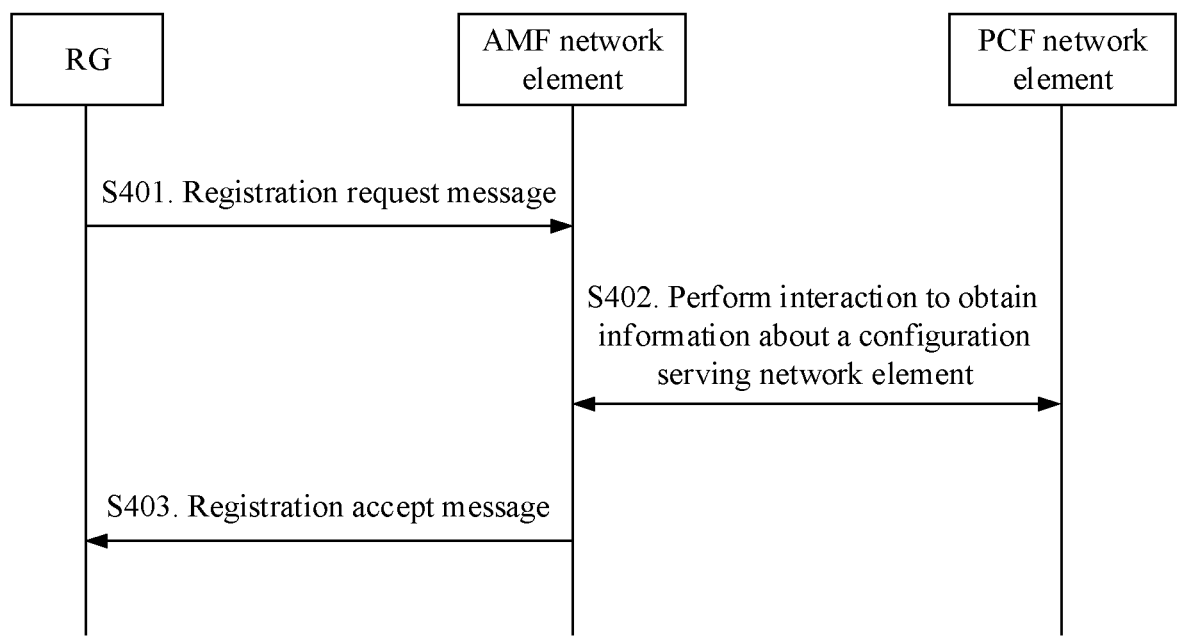
FIG. 6 is a flowchart of still another network configuration method according to an embodiment of this application.

Manner 2. The configuration network element is the PCF network element or a UDR network element. FIG. 6 is a flowchart of still another network configuration method according to an embodiment of this application. As shown in FIG. 6, the method includes the following steps.

S401. The RG sends the registration request message to the AMF network element.

The registration request message may include the identifier of the RG and/or the second indication information.

S402. The AMF network element interacts with the PCF network element to obtain the information about the configuration serving network element.

When interacting with the PCF network element to obtain a policy for accessing a core network by the RG, the AMF network element may send, to the PCF network element, a request message (namely, the second request message) used to obtain the policy for accessing the core network by the RG. If the PCF network element is the configuration network element, the PCF network element may obtain, based on the second request message, the information about the configuration serving network element and the policy for accessing the core network by the RG, and return, to the AMF network element, a response message (the second response message) that carries the information about the configuration serving network element and the policy for accessing the core network by the RG.

If the UDR network element is the configuration network element, after receiving the request message (namely, the second request message) that is from the AMF network element and that is used to obtain the policy for accessing the core network by the RG, the PCF network element may send, to the UDR network element, the third request message used to obtain the information about the configuration serving network element. After receiving the third request message, the UDR network element may obtain the information about the configuration serving network element based on the third request message, and feed back, to the PCF network element, the third response message including the information about the configuration serving network element. The PCF network element may return, to the AMF network element based on the third response message, a response message (the second response message) that carries the information about the configuration serving network element and the policy for accessing the core network by the RG.

It may be understood that, whether the second request message and the third request message specifically include the identifier of the RG, the second indication information, or the identifier of the RG and the second indication information may be determined based on the registration request message.

S403. The AMF network element sends the registration accept message to the RG.

The registration accept message includes the information about the configuration serving network element.

After S403 is performed, the procedure ends.

It should be noted that if an access network corresponding to an access network device is a fixed broadband access network, when performing the foregoing registration procedure, the RG may alternatively interact with the AMF network element by using an FMIF network element in the fixed broadband access network. Specifically, in step S401, the RG initiates a request message to the FMIF, to trigger the FMIF to send the registration request message to the AMF.

In step 403, after receiving address information of an ACS, the FMIF sends the address information of the ACS to a fixed network (FN)-RG. Message exchange between the RG and the FMIF uses an interactive message, such as a point-to-point protocol over Ethernet (PPPoE) or DHCP message, in an existing fixed network. This is not limited in this application. In another possible implementation, alternatively, if an access network corresponding to an access network device is a fixed broadband access network, and the RG does not support an RG function defined by the 3GPP, when performing the foregoing registration procedure, the RG may interact with the AMF network element by using an FMIF network element in the fixed broadband access network.

A person skilled in the art may understand that the registration procedures shown in FIG. 5 and FIG. 6 do not constitute a limitation on the registration procedure. During specific implementation, the registration procedure may include more or fewer steps than those shown in the figures, some steps may be combined, and so on. Correspondingly, the foregoing messages may alternatively include more information. This is not limited herein.

In this manner, the RG obtains, from the 5G network architecture through the registration procedure, the information about the configuration serving network element corresponding to the RG. After obtaining the information about the configuration serving network element corresponding to the RG, the RG may establish the connection to the configuration serving network element based on the address information of the configuration serving network element that is carried in the information about the configuration serving network element, so that the configuration serving network element can automatically configure the RG by using the 5G network architecture.

Second scenario. The RG obtains the information about the configuration serving network element through a session establishment procedure. In this scenario, the first request message is a session establishment request message, and the first response message is a session establishment accept message.

Figure 7:
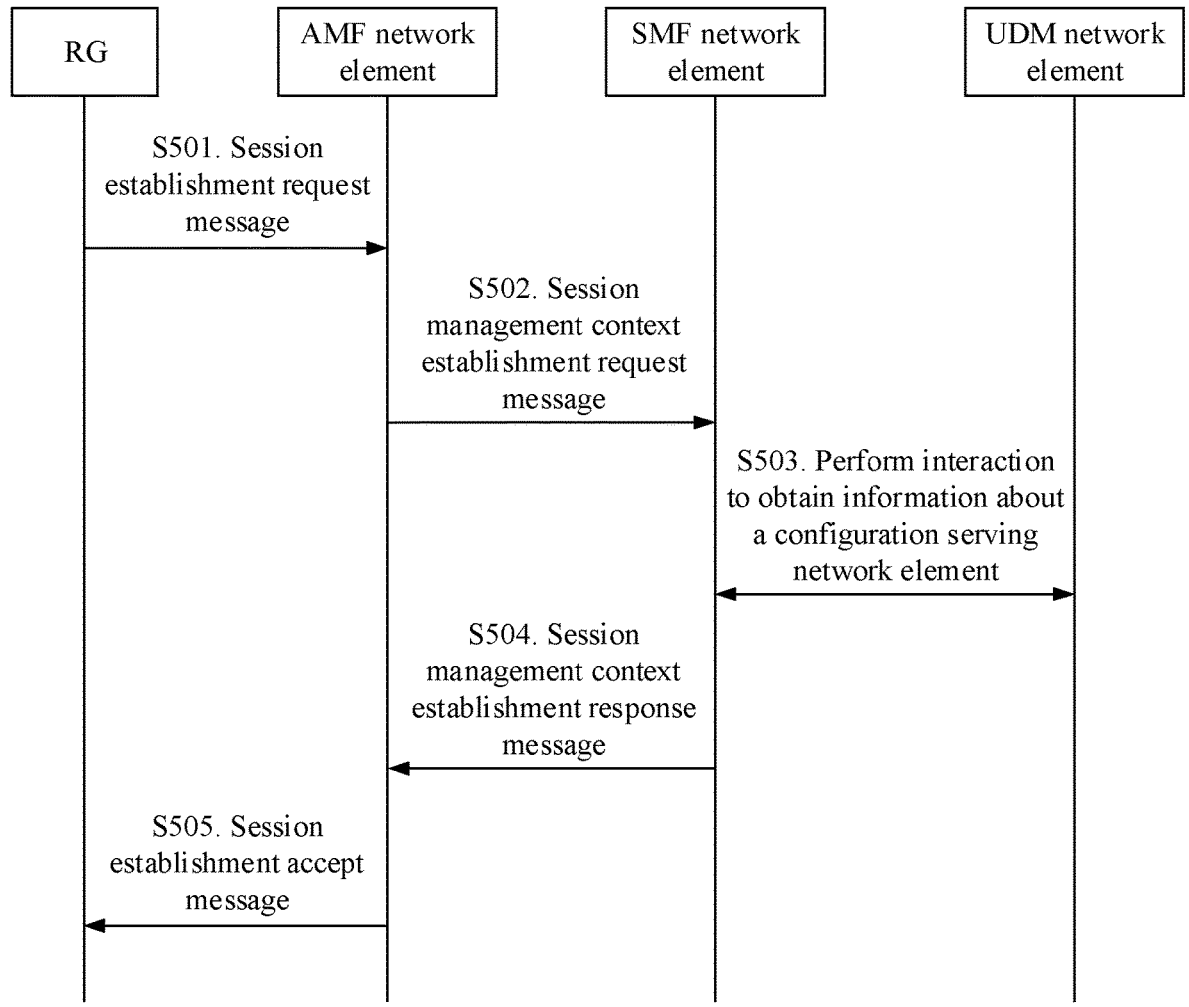
FIG. 7 is a flowchart of still another network configuration method according to an embodiment of this application.

Manner 1. The configuration network element is the UDM network element or a UDR network element. FIG. 7 is a flowchart of still another network configuration method according to an embodiment of this application. As shown in FIG. 7, the method includes the following steps.

S501. The RG sends the session establishment request message to the AMF network element.

The session establishment request message is used to request to establish a session of the RG. The session establishment request message may include the identifier of the RG and/or the second indication information.

S502. The AMF network element sends a session management context establishment request message to the SMF network element.

The session management context establishment request message may include the identifier of the RG and/or the second indication information.

S503. The SMF network element interacts with the UDM network element to obtain the information about the configuration serving network element.

When interacting with the UDM network element to obtain subscription data of the RG, the SMF network element may send, to the UDM network element, a request message (namely, the second request message) used to obtain the subscription data of the RG. If the UDM network element is the configuration network element, the UDM network element may obtain the information about the configuration serving network element and the subscription data of the RG based on the second request message, and return, to the SMF network element, a response message that carries the information about the configuration serving network element and the subscription data of the RG.

If the UDR network element is the configuration network element, after receiving the request message (namely, the second request message) that is from the SMF network element and that is used to obtain the subscription data of the RG, the UDM network element may send, to the UDR network element, the third request message used to obtain the information about the configuration serving network element. After receiving the third request message, the UDR network element may obtain the information about the configuration serving network element based on the third request message, and feed back, to the UDM network element, the third response message including the information about the configuration serving network element. The UDM network element may return, to the SMF network element based on the third response message, a response message (the second response message) that carries the information about the configuration serving network element and the subscription data of the RG.

It may be understood that, whether the second request message and the third request message specifically include the identifier of the RG, the second indication information, or the identifier of the RG and the second indication information may be determined based on the session establishment request message.

S504. The SMF network element sends a session management context establishment response message to the AMF network element.

The session management context establishment response message includes the information about the configuration serving network element.

S505. The AMF network element sends the session establishment accept message to the RG.

The session establishment accept message is used to notify that the session of the RG has been established. The session establishment accept message includes the information about the configuration serving network element.

After S505 is performed, the procedure ends.

Figure 8:
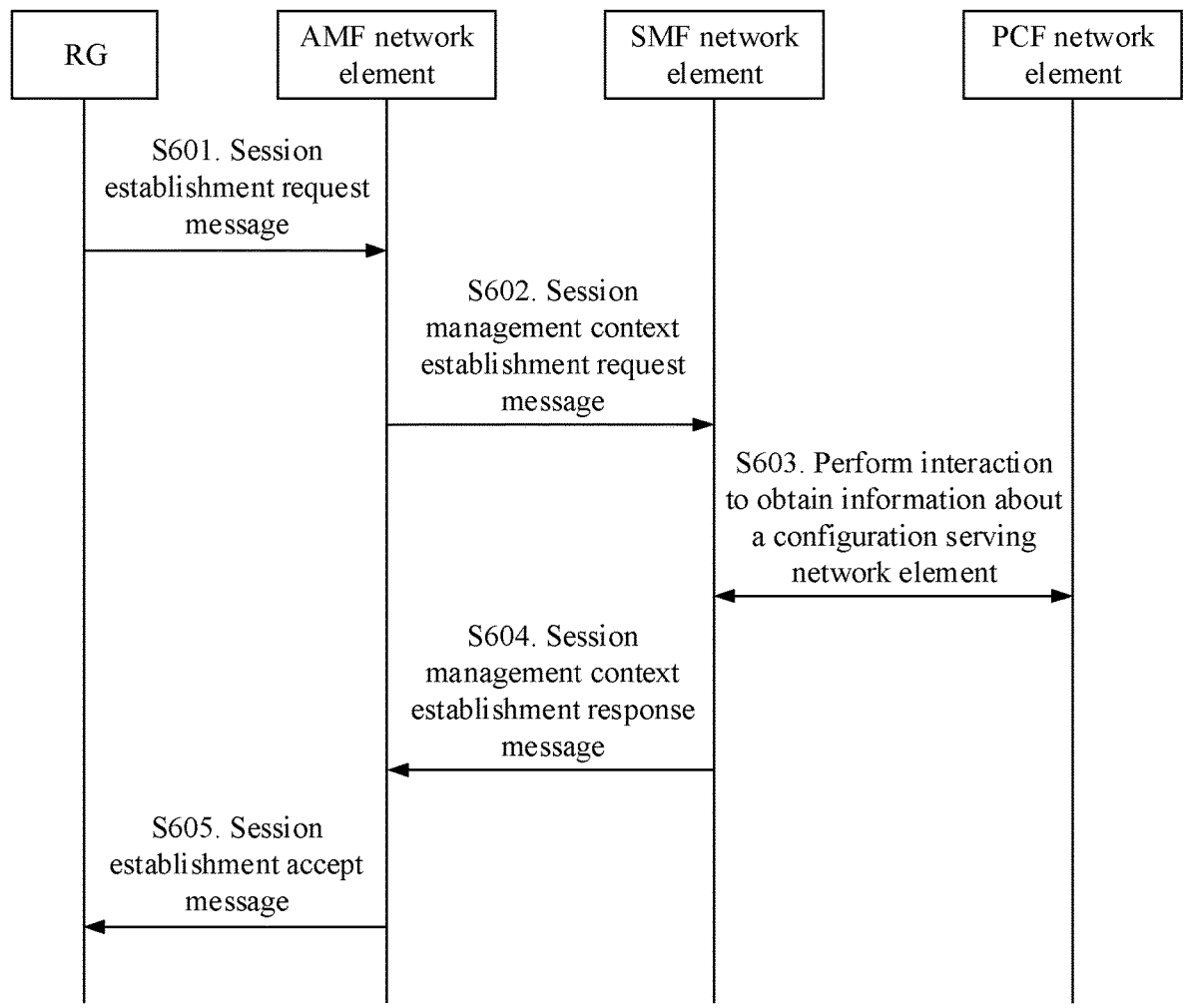
FIG. 8 is a flowchart of still another network configuration method according to an embodiment of this application.

Manner 2. The configuration network element is the PCF network element or a UDR network element. FIG. 8 is a flowchart of still another network configuration method according to an embodiment of this application. As shown in FIG. 8, the method includes the following steps.

S601. The RG sends the session establishment request message to the AMF network element.

The session establishment request message may include the identifier of the RG and/or the second indication information.

S602. The AMF network element sends a session management context establishment request message to the SMF network element.

The session management context establishment request message may include the identifier of the RG and/or the second indication information.

S603. The SMF network element interacts with the PCF network element to obtain the information about the configuration serving network element.

When interacting with the PCF network element to obtain a policy for accessing a core network by the RG, the SMF network element may send, to the PCF network element, a request message (namely, the second request message) used to obtain the policy for accessing the core network by the RG. If the PCF network element is the configuration network element, the PCF network element may obtain, based on the second request message, the information about the configuration serving network element and the policy for accessing the core network by the RG, and return, to the SMF network element, a response message (the second response message) that carries the information about the configuration serving network element and the policy for accessing the core network by the RG.

If the UDR network element is the configuration network element, after receiving the request message (namely, the second request message) that is from the SMF network element and that is used to obtain the policy for accessing the core network by the RG, the PCF network element may send, to the UDR network element, the third request message used to obtain the information about the configuration serving network element. After receiving the third request message, the UDR network element may obtain the information about the configuration serving network element based on the third request message, and feed back, to the PCF network element, the third response message including the information about the configuration serving network element. The PCF network element may return, to the SMF network element based on the third response message, a response message (the second response message) that carries the information about the configuration serving network element and the policy for accessing the core network by the RG.

It may be understood that, whether the second request message and the third request message specifically include the identifier of the RG, the second indication information, or the identifier of the RG and the second indication information may be determined based on the session establishment request message.

S604. The SMF network element sends a session management context establishment response message to the AMF network element.

The session management context establishment response message includes the information about the configuration serving network element.

S605. The AMF network element sends the session establishment accept message to the RG.

The session establishment accept message includes the information about the configuration serving network element.

After S605 is performed, the procedure ends.

It should be noted that if an access network corresponding to an access network device is a fixed broadband access network, when performing the foregoing session establishment procedure, the RG may alternatively interact with the AMF network element by using an FMIF network element in the fixed broadband access network. Specifically, in step S501, the RG initiates a request message to the FMIF, to trigger the FMIF to send the session establishment request to the AMF. In step 605, the AMF network element sends the session establishment accept message to the FMIF, and the FMIF sends received address information of an ACS to the RG. Message exchange between the RG and the FMIF uses an interactive message, such as a PPPoE or DHCP message, in an existing fixed network. This is not limited in this application.

A person skilled in the art may understand that the session establishment procedures shown in FIG. 7 and FIG. 8 do not constitute a limitation on the session establishment procedure. During specific implementation, the session establishment procedure may include more or fewer steps than those shown in the figures, some steps may be combined, and so on. Correspondingly, the foregoing messages may alternatively include more information. This is not limited herein.

In this manner, the RG obtains, from the 5G network architecture through the session establishment procedure, the information about the configuration serving network element corresponding to the RG. After obtaining the information about the configuration serving network element corresponding to the RG, the RG may establish the connection to the configuration serving network element based on the address information of the configuration serving network element that is carried in the information about the configuration serving network element, so that the configuration serving network element can automatically configure the RG by using the 5G network architecture.

Third scenario. The RG obtains the information about the configuration serving network element through a session establishment procedure and an access procedure for accessing the data network. The SMF network element is an SMF network element integrated with a function of the DHCP server. In this scenario, the first request message is an access request message for requesting to access the data network, and includes the identifier of the RG. The first response message is a feedback message for the access request message. For example, the access request message is a DHCP discover message of DHCP version 4 (DHCPv4), and the feedback message is a DHCP offer message of DHCPv4. Alternatively, the access request message is a DHCP request message of DHCPv4, and the feedback message is a DHCP acknowledgment (Ack) message of DHCPv4. Alternatively, the access request message is a DHCP inform message of DHCPv4, and the feedback message is a DHCP acknowledgment message of DHCPv4. Alternatively, the access request message is a DHCP solicit message of DHCP version 6 (DHCPv6), and the feedback message may be a DHCP advertise message of DHCPv6. Alternatively, the access request message is a DHCP request message of DHCPv6, and the feedback message may be a DHCP reply message of DHCPv6.

Figure 9:
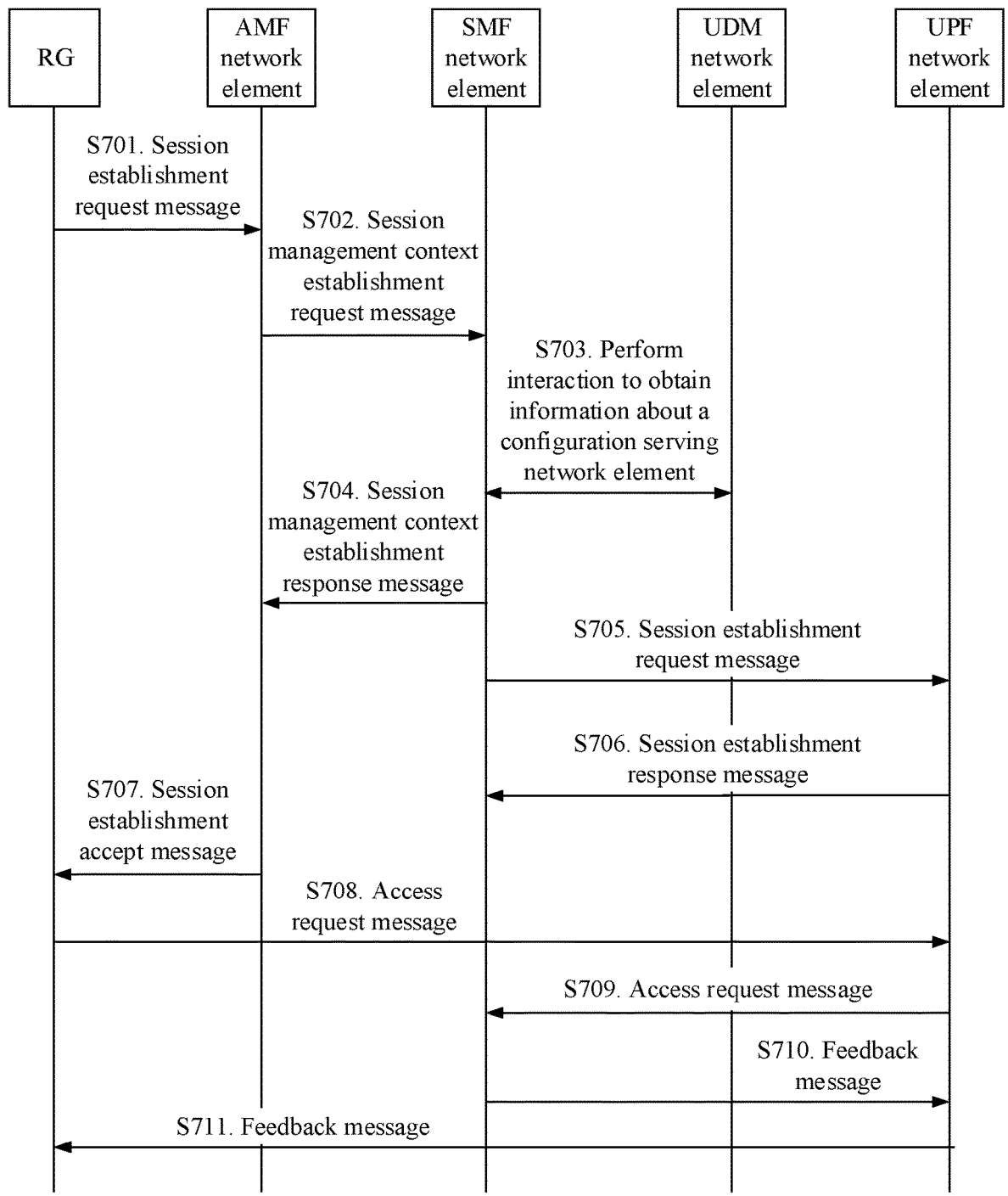
FIG. 9 is a flowchart of still another network configuration method according to an embodiment of this application.

Manner 1. The configuration network element is the UDM network element or a UDR network element. FIG. 9 is a flowchart of still another network configuration method according to an embodiment of this application. As shown in FIG. 9, the method includes the following steps.

S701. The RG sends a session establishment request message to the AMF network element.

The session establishment request message may include the identifier of the RG and/or the second indication information.

S702. The AMF network element sends a session management context establishment request message to the SMF network element.

The session management context establishment request message may include the identifier of the RG and/or the second indication information.

S703. The SMF network element interacts with the UDM network element to obtain the information about the configuration serving network element.

When interacting with the UDM network element to obtain subscription data of the RG, the SMF network element may send, to the UDM network element, a request message (namely, the second request message) used to obtain the subscription data of the RG. If the UDM network element is the configuration network element, the UDM network element may obtain the information about the configuration serving network element and the subscription data of the RG based on the second request message, and return, to the SMF network element, a response message that carries the information about the configuration serving network element and the subscription data of the RG.

If the UDR network element is the configuration network element, after receiving the request message (namely, the second request message) that is from the SMF network element and that is used to obtain the subscription data of the RG, the UDM network element may send, to the UDR network element, the third request message used to obtain the information about the configuration serving network element. After receiving the third request message, the UDR network element may obtain the information about the configuration serving network element based on the third request message, and feed back, to the UDM network element, the third response message including the information about the configuration serving network element. The UDM network element may return, to the SMF network element based on the third response message, a response message (the second response message) that carries the information about the configuration serving network element and the subscription data of the RG.

It may be understood that, whether the second request message and the third request message specifically include the identifier of the RG, the second indication information, or the identifier of the RG and the second indication information may be determined based on the session establishment request message.

S704. The SMF network element sends a session management context establishment response message to the AMF network element.

S705. The SMF network element sends a session establishment request message to the UPF network element.

The session establishment request message is used to request to establish a session context of the UPF network element.

S706. The UPF network element sends a session establishment response message to the SMF network element.

S707. The AMF network element sends a session establishment accept message to the RG.

After S707 is performed, the session establishment procedure ends, and the subsequent access procedure for accessing the data network is as follows.

S708. The RG sends the access request message to the UPF network element.

The access request message is used to request to access the data network. The access request message includes the identifier of the RG.

S709. The UPF network element sends the access request message to the SMF network element.

The access request message includes the identifier of the RG.

S710. The SMF network element sends the feedback message to the UPF network element.

The feedback message includes the information about the configuration serving network element.

After receiving the access request message that is from the RG and forwarded by the UPF network element, the SMF network element may determine, based on the identifier of the RG that is carried in the access request message, that the SMF network element has obtained, in the session establishment procedure of the RG, the information about the configuration serving network element corresponding to the RG. In this scenario, the SMF network element may add the information about the configuration serving network element to the feedback message, and send the feedback message to the UPF network element. Optionally, the feedback message may further include an IP address allocated by the SMF network element to the RG.

In a possible implementation, it is assumed that the SMF network element does not find, based on the identifier of the RG that is carried in the access request message, the information about the configuration serving network element corresponding to the RG, that is, the SMF network element does not obtain, in the session establishment procedure of the RG, the information about the configuration serving network element corresponding to the RG. In this scenario, the SMF network element may send the received access request message to the DHCP server in the data network based on an existing procedure for accessing the data network, and the DHCP server processes the access procedure of the RG. For details, refer to other approaches, and details are not described herein.

S711. The UPF network element sends the feedback message to the RG.

The feedback message includes the information about the configuration serving network element.

After S711 is performed, the access procedure ends.

Figure 10:
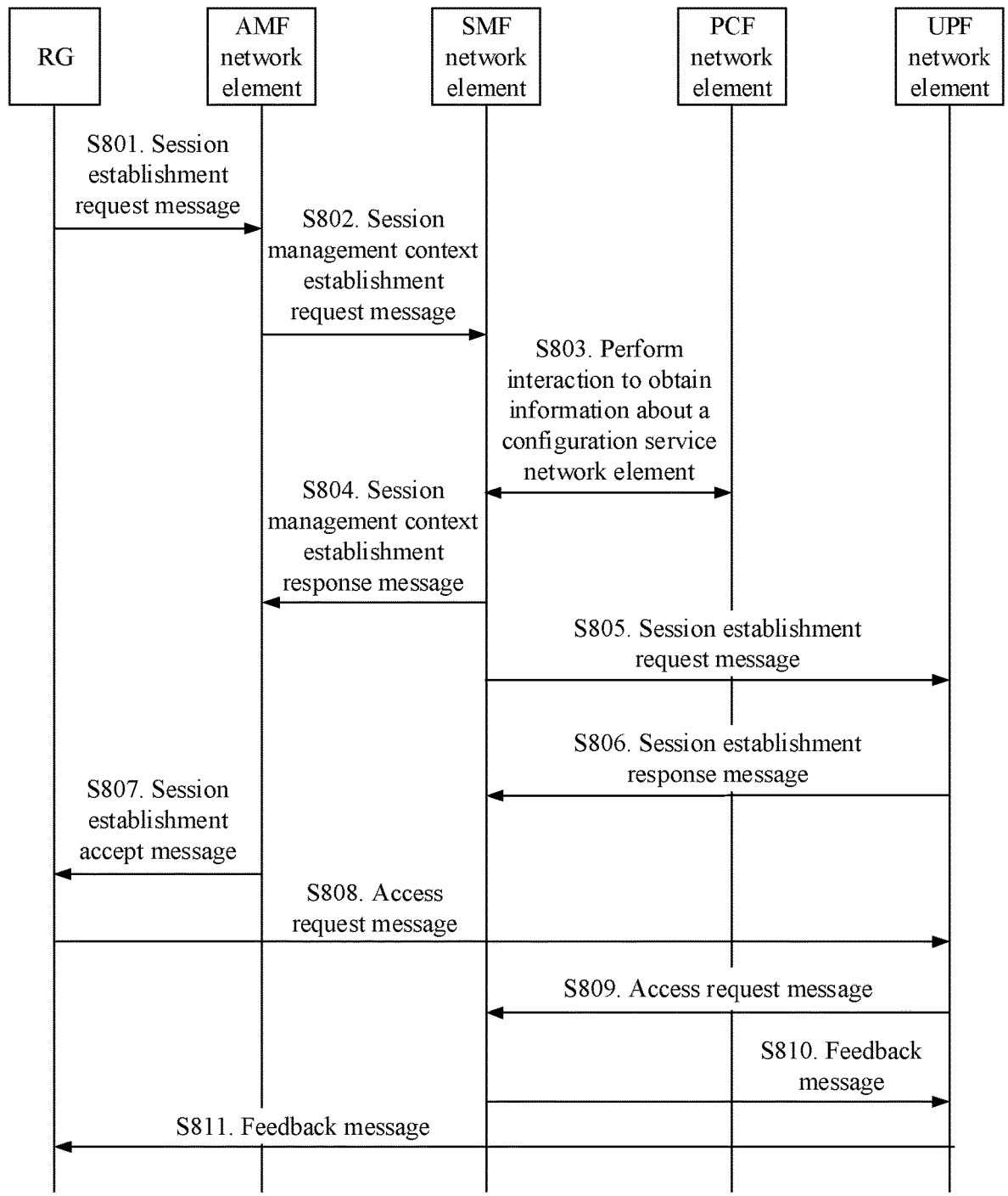
FIG. 10 is a flowchart of still another network configuration method according to an embodiment of this application.

Manner 2. The configuration network element is the PCF network element or a UDR network element. FIG. 10 is a flowchart of still another network configuration method according to an embodiment of this application. As shown in FIG. 10, the method includes the following steps.

S801. The RG sends a session establishment request message to the AMF network element.

The session establishment request message may include the identifier of the RG and/or the second indication information.

S802. The AMF network element sends a session management context establishment request message to the SMF network element.

The session management context establishment request message may include the identifier of the RG and/or the second indication information.

S803. The SMF network element interacts with the PCF network element to obtain the information about the configuration serving network element.

When interacting with the PCF network element to obtain a policy for accessing a core network by the RG, the SMF network element may send, to the PCF network element, a request message (namely, the second request message) used to obtain the policy for accessing the core network by the RG. If the PCF network element is the configuration network element, the PCF network element may obtain, based on the second request message, the information about the configuration serving network element and the policy for accessing the core network by the RG, and return, to the SMF network element, a response message (the second response message) that carries the information about the configuration serving network element and the policy for accessing the core network by the RG.

If the UDR network element is the configuration network element, after receiving the request message (namely, the second request message) that is from the SMF network element and that is used to obtain the policy for accessing the core network by the RG, the PCF network element may send, to the UDR network element, the third request message used to obtain the information about the configuration serving network element. After receiving the third request message, the UDR network element may obtain the information about the configuration serving network element based on the third request message, and feed back, to the PCF network element, the third response message including the information about the configuration serving network element. The PCF network element may return, to the SMF network element based on the third response message, a response message (the second response message) that carries the information about the configuration serving network element and the policy for accessing the core network by the RG.

It may be understood that, whether the second request message and the third request message specifically include the identifier of the RG, the second indication information, or the identifier of the RG and the second indication information may be determined based on the session establishment request message.

S804. The SMF network element sends a session management context establishment response message to the AMF network element.

S805. The SMF network element sends a session establishment request message to the UPF network element.

The session establishment request message is used to request to establish a session context of the UPF network element.

S806. The UPF network element sends a session establishment response message to the SMF network element.

S807. The AMF network element sends a session establishment accept message to the RG.

After S807 is performed, the session establishment procedure ends, and the subsequent access procedure for accessing the data network is as follows.

S808. The RG sends the access request message to the UPF network element.

The access request message includes the identifier of the RG.

S809. The UPF network element sends the access request message to the SMF network element.

The access request message includes the identifier of the RG.

S810. The SMF network element sends the feedback message to the UPF network element.

The feedback message includes the information about the configuration serving network element.

After receiving the access request message that is from the RG and forwarded by the UPF network element, the SMF network element may determine, based on the identifier of the RG that is carried in the access request message, that the SMF network element has obtained, in the session establishment procedure of the RG, the information about the configuration serving network element corresponding to the RG. In this scenario, the SMF network element may add the information about the configuration serving network element to the feedback message, and send the feedback message to the UPF network element. Optionally, the feedback message may further include an IP address allocated by the SMF network element to the RG.

In a possible implementation, it is assumed that the SMF network element does not find, based on the identifier of the RG that is carried in the access request message, the information about the configuration serving network element corresponding to the RG, that is, the SMF network element does not obtain, in the session establishment procedure of the RG, the information about the configuration serving network element corresponding to the RG. In this scenario, the SMF network element may send the received access request message to the DHCP server in the data network based on an existing procedure for accessing the data network, and the DHCP server processes the access procedure of the RG. For details, refer to other approaches, and details are not described herein.

S811. The UPF network element sends the feedback message to the RG.

The feedback message includes the information about the configuration serving network element.

After S811 is performed, the access procedure ends.

It should be noted that if an access network corresponding to an access network device is a fixed broadband access network, when performing the foregoing session establishment procedure and access procedure, the RG may alternatively interact with a core network element by using an FMIF network element in the fixed broadband access network.

Specifically, in step S701 or S801, the RG initiates a request message to the FMIF, to trigger the FMIF to send the session establishment request to the AMF. In step S707 or S807, the AMF network element sends the session establishment accept message to the FMIF. Message exchange between the RG and the FMIF uses an interactive message, such as a PPPoE or DHCP message, in an existing fixed network. This is not limited in this application.

A person skilled in the art may understand that the session establishment procedures and the access procedures that are shown in FIG. 9 and FIG. 10 do not constitute a limitation on the session establishment procedure and the access procedure. During specific implementation, the session establishment procedure and the access procedure may include more or fewer steps than those shown in the figures, some steps may be combined, and so on. Correspondingly, the foregoing messages may alternatively include more information. This is not limited herein.

In this manner, the RG obtains, from the 5G network architecture through the session establishment procedure and the access procedure, the information about the configuration serving network element corresponding to the RG. After obtaining the information about the configuration serving network element corresponding to the RG, the RG may establish the connection to the configuration serving network element based on the address information of the configuration serving network element that is carried in the information about the configuration serving network element, so that the configuration serving network element can automatically configure the RG by using the 5G network architecture.

Fourth scenario. After performing a session establishment procedure, the RG obtains the information about the configuration serving network element through an access procedure for accessing the data network. In this scenario, the first request message is an access request message for requesting to access the data network, the first response message is a feedback message for the access request message, and the configuration network element is the DHCP server. For descriptions of the first request message and the first response message, refer to the descriptions of the first request message and the first response message in the third scenario. Details are not described herein again.

Figure 11:
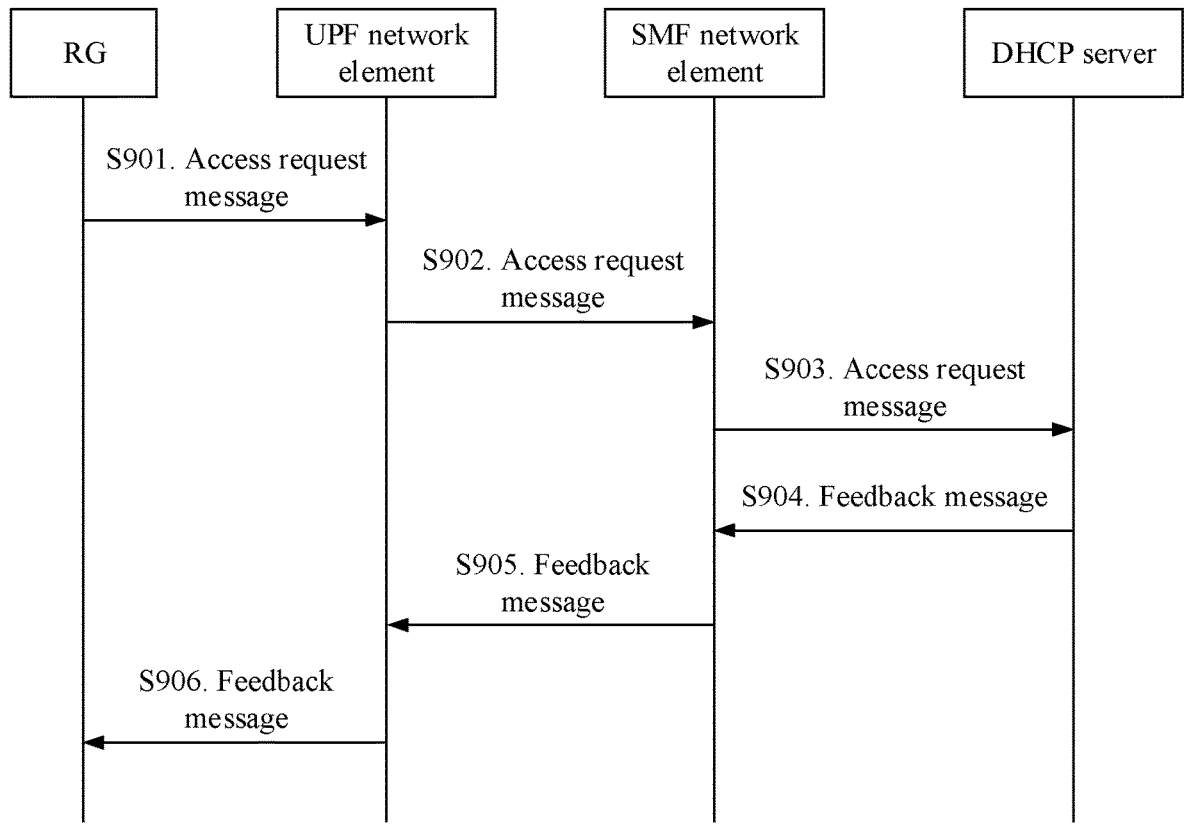
FIG. 11 is a flowchart of still another network configuration method according to an embodiment of this application.

FIG. 11 is a flowchart of still another network configuration method according to an embodiment of this application. As shown in FIG. 11, the method includes the following steps.

S901. The RG sends the access request message to the UPF network element.

The access request message includes the identifier of the RG and/or the second indication information.

S902. The UPF network element sends the access request message to the SMF network element.

The access request message includes the identifier of the RG and/or the second indication information.

S903. The SMF network element sends the access request message to the DHCP server.

The access request message includes the identifier of the RG and/or the second indication information.

In a possible implementation, if there are a plurality of DHCP servers in the 5G network architecture, and each DHCP server corresponds to one or more operators and stores information about configuration serving network elements of data networks of the one or more operators, when sending the access request message to a DHCP server, the SMF network element may determine, based on the identifier of the RG in the access request message, an operator to which the RG belongs. Then, the SMF network element may forward the access request message to a DHCP server corresponding to the operator to which the RG belongs.

S904. The DHCP server sends the feedback message to the SMF network element.

The feedback message includes the information about the configuration serving network element.

S905. The SMF network element sends the feedback message to the UPF network element.

S906. The UPF network element sends the feedback message to the RG.

The feedback message includes the information about the configuration serving network element.

After S906 is performed, the access procedure ends.

It should be noted that if an access network corresponding to an access network device is a fixed broadband access network, when performing the foregoing access procedure, the RG may alternatively interact with a core network element by using an FMIF network element in the fixed broadband access network.

A person skilled in the art may understand that the access procedure shown in FIG. 11 does not constitute a limitation on the access procedure. During specific implementation, the access procedure may include more or fewer steps than those shown in the figures, some steps may be combined, and so on. Correspondingly, the foregoing messages may alternatively include more information. This is not limited herein.

In this manner, the RG obtains, from the 5G network architecture through the access procedure, the information about the configuration serving network element corresponding to the RG. After obtaining the information about the configuration serving network element corresponding to the RG, the RG may establish the connection to the configuration serving network element based on the address information of the configuration serving network element that is carried in the information about the configuration serving network element, so that the configuration serving network element can automatically configure the RG by using the 5G network architecture.

Fifth scenario. After the RG obtains, from the 5G network architecture in any manner shown in the foregoing first scenario to fourth scenario, the information about the configuration serving network element corresponding to the RG, if the configuration serving network element updates the information about the configuration serving network element to the 5G network architecture by performing the procedure shown in FIG. 3, the configuration network element may further perform the following configuration information update procedure after updating the information about the configuration serving network element based on the configuration request message from the configuration serving network element. Details are as follows.

Figure 12:
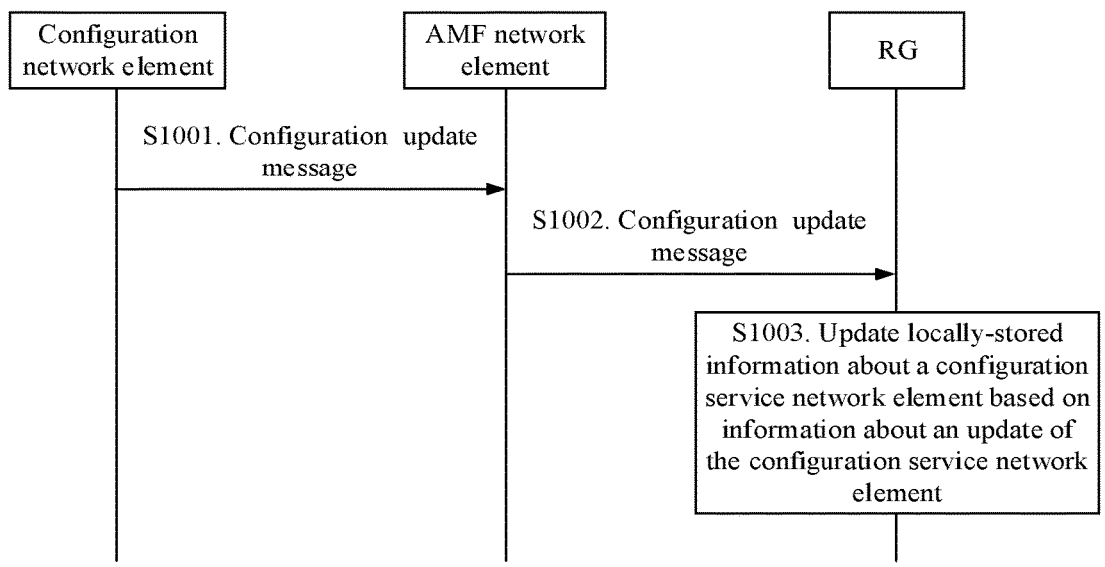
FIG. 12 is a flowchart of still another network configuration method according to an embodiment of this application.

FIG. 12 is a flowchart of still another network configuration method according to an embodiment of this application. As shown in FIG. 12, the method includes the following steps.

S1001. The configuration network element sends the configuration information update message to the AMF network element.

The configuration network element may be the UDR network element, the data management network element (for example, the UDM network element), the policy control network element (for example, the PCF network element), the DHCP server, or the like.

S1002. The AMF network element sends the configuration information update message to the RG.

The configuration information update message includes the update information of the configuration serving network element. Alternatively, the configuration information update message includes the update information of the configuration serving network element and the first indication information.

S1003. The RG updates the locally-stored information about the configuration serving network element based on the update information of the configuration serving network element.

After S1003 is performed, the procedure ends.

In a possible implementation, after performing S1003, the RG may send a configuration information update complete message to the AMF network element, to notify that the RG has updated configuration information. Correspondingly, after receiving the configuration information update complete message from the RG, the AMF network element may send the configuration information update complete message to the configuration network element, to notify the configuration network element that the RG has updated the configuration information. Details are not described herein.

It should be noted that if an access network corresponding to an access network device is a fixed broadband access network, when performing the foregoing configuration information update procedure, the RG may interact with a core network element by using an FMIF network element in the fixed broadband access network.

In this manner, the RG obtains, from the 5G network architecture through the configuration information update procedure, the update information of the configuration serving network element corresponding to the RG. In this way, the RG may subsequently establish the connection to the configuration serving network element based on the address information of the configuration serving network element that is carried in the accurate information about the configuration serving network element, so that the configuration serving network element can automatically configure the RG by using the 5G network architecture, improving efficiency of automatic configuration.

According to the network configuration method provided in this embodiment of this application, the configuration serving network element may configure the information about the configuration serving network element for the 5G network architecture, so that the terminal device can obtain the information about the configuration serving network element from the 5G network architecture. The information about the configuration serving network element includes the address information of the configuration serving network element. In this way, the terminal device can establish the connection to the configuration serving network element based on the address information of the configuration serving network element, so that the configuration serving network element can automatically configure the terminal device by using the 5G network architecture.

Figure 13:
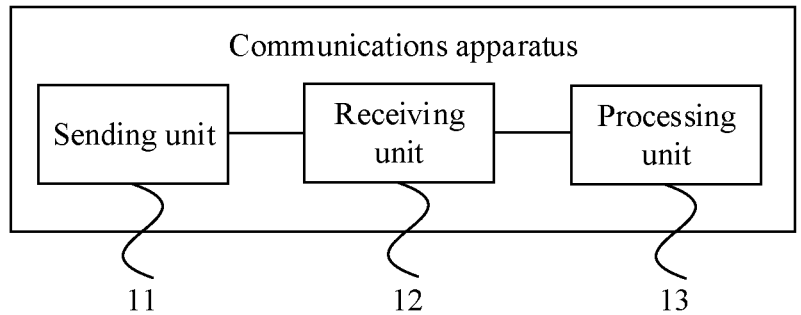
FIG. 13 is a schematic structural diagram of a communications apparatus according to an embodiment of this application.

FIG. 13 is a schematic structural diagram of a communications apparatus according to an embodiment of this application. The communications apparatus in this embodiment may be the foregoing terminal device, or may be a chip applied to the terminal device. The communications apparatus may be configured to perform actions of the terminal device in the foregoing method embodiments. As shown in FIG. 13, the communications apparatus may include a sending unit 11 and a receiving unit 12.

The sending unit 11 is configured to send a request message to a core network element, where the request message is used to obtain information about a configuration serving network element, and the information about the configuration serving network element includes address information of the configuration serving network element.

The receiving unit 12 is configured to receive a response message from the core network element, where the response message includes the information about the configuration serving network element. For example, the core network element is an access management network element, the request message is a registration request message, and the response message is a registration accept message. Alternatively, the core network element is a session management network element, the request message is a session establishment request message, and the response message is a session establishment response message. Alternatively, the core network element is a session management network element, the request message is an access request message for requesting to access a data network, and the response message is a feedback message for the access request message.

In a possible implementation, the request message includes an identifier of the terminal device and/or first indication information, and the first indication information is used to request to obtain the information about the configuration serving network element. For example, the first indication information is an identifier of the data network to be accessed by the terminal device.

In a possible implementation, the apparatus further includes a processing unit 13.

The receiving unit 12 is further configured to receive a configuration update message from the access management network element, where the configuration update message is used to instruct to update the information about the configuration serving network element, and the configuration update message includes update information of the configuration serving network element.

The processing unit 13 is configured to update the locally-stored information about the configuration serving network element based on the update information of the configuration serving network element.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

The communications apparatus provided in this embodiment of this application may perform the actions of the terminal device in the foregoing method embodiments. Implementation principles and technical effects thereof are similar, and details are not described herein again.

Figure 14:
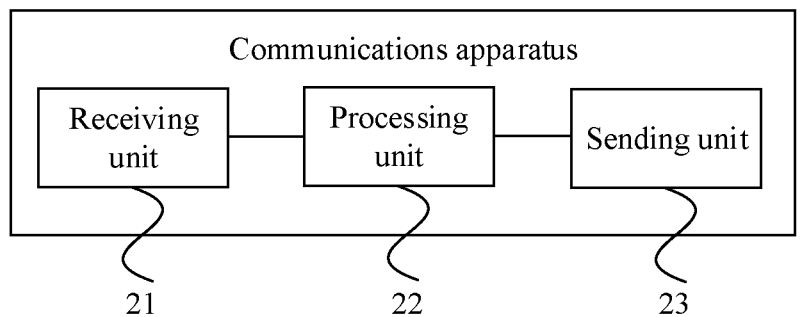
FIG. 14 is a schematic structural diagram of another communications apparatus according to an embodiment of this application.

FIG. 14 is a schematic structural diagram of another communications apparatus according to an embodiment of this application. The communications apparatus in this embodiment may be the foregoing core network element, or may be a chip applied to the core network element. The communications apparatus may be configured to perform actions of the core network element in the foregoing method embodiments. The core network element herein may be a configuration network element, for example, a UDR network element, a data management network element (for example, a UDM network element), a policy control network element (for example, a PCF network element), or a DHCP server, or a core network element connected to a configuration network element. As shown in FIG. 14, the communications apparatus may include a receiving unit 21, a processing unit 22, and a sending unit 23.

The receiving unit 21 is configured to receive a request message from a core network element, where the request message is used to obtain information about a configuration serving network element, and the information about the configuration serving network element includes address information of the configuration serving network element. The core network element herein may be any one of the following network elements a data management network element, a policy control network element, a session management network element, and an access management network element.

The processing unit 22 is configured to obtain the information about the configuration serving network element based on the request message.

The sending unit 23 is configured to send a response message to the core network element, where the response message includes the information about the configuration serving network element.

In a possible implementation, the request message includes an identifier of a terminal device and/or first indication information, and the first indication information is used to request to obtain the information about the configuration serving network element. For example, the first indication information is an identifier of a data network to be accessed by the terminal device.

In a possible implementation, the request message includes the identifier of the terminal device. The processing unit 22 is further configured to determine, based on the identifier of the terminal device, an identifier of an operator to which the configuration serving network element belongs, and obtain the information about the configuration serving network element based on the identifier of the operator to which the configuration serving network element belongs.

In a possible implementation, the receiving unit 21 is further configured to receive a configuration request message from a network exposure network element or a UDR network element, where the configuration request message includes the information about the configuration serving network element, and the processing unit 22 is further configured to process the information about the configuration serving network element based on the configuration request message.

In a possible implementation, the processing unit 22 is further configured to store the information about the configuration serving network element based on the configuration request message.

In a possible implementation, the configuration request message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

In this implementation, the processing unit 22 is further configured to send the configuration request message to a data management network element or a policy control network element by using the sending unit 23. Alternatively, the processing unit 22 is further configured to process the information about the configuration serving network element based on the second indication information.

After the processing unit 22 processes the information about the configuration serving network element based on the second indication information, the sending unit 23 is further configured to send a configuration update message to the access management network element, where the configuration update message is used to instruct to update the information about the configuration serving network element, and the configuration update message includes update information of the configuration serving network element. In a possible implementation, the configuration information update message further includes the second indication information.

The communications apparatus provided in this embodiment of this application may perform actions of the configuration network element or the core network element connected to the configuration network element in the foregoing method embodiments. Implementation principles and technical effects thereof are similar, and details are not described herein again.

Figure 15:
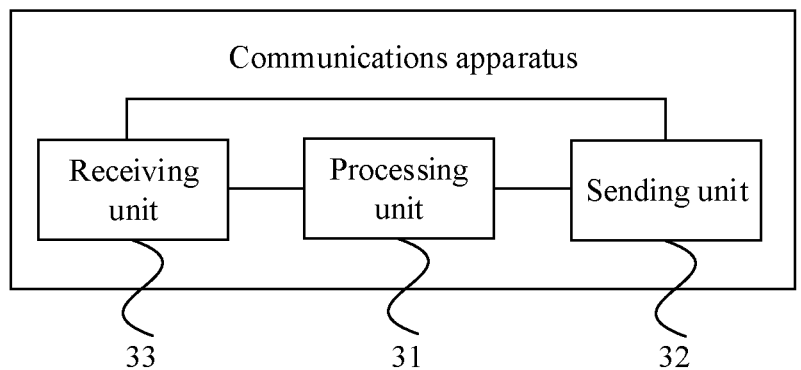
FIG. 15 is a schematic structural diagram of still another communications apparatus according to an embodiment of this application.

FIG. 15 is a schematic structural diagram of still another communications apparatus according to an embodiment of this application. The communications apparatus in this embodiment may be the foregoing first core network element, or may be a chip applied to the first core network element. The communications apparatus may be configured to perform actions of the first core network element in the foregoing method embodiments. The first core network element herein may be, for example, an access management network element (for example, an AMF network element) or a session management network element (for example, an SMF network element). As shown in FIG. 15, the communications apparatus may include a processing unit 31 and a sending unit 32. Optionally, the communications apparatus may further include a receiving unit 33.

The processing unit 31 is configured to obtain information about a configuration serving network element corresponding to a terminal device.

The sending unit 32 is configured to send a response message to the terminal device, where the response message includes the information about the configuration serving network element, and the information about the configuration serving network element includes address information of the configuration serving network element.

In a possible implementation, the receiving unit 33 is configured to, before the obtaining unit obtains information about a configuration service platform, receive a request message from the terminal device, where the request message is used to obtain the information about the configuration serving network element.

In a possible implementation, the receiving unit 33 is configured to, after the obtaining unit obtains information about a configuration service platform, receive a request message from the terminal device, where the request message is used to obtain the information about the configuration serving network element.

In a possible implementation, the request message includes an identifier of the terminal device and/or first indication information, and the first indication information is used to request to obtain the information about the configuration serving network element.

In a possible implementation, the processing unit 31 is further configured to send a request message to a data management network element by using the sending unit 32, and receive, by using the receiving unit 33, a response message from the data management network element, where the request message is used to obtain the information about the configuration serving network element, and the response message includes the information about the configuration serving network element.

Alternatively, the processing unit 31 is further configured to send the request message to a policy control network element by using the sending unit 32, and receive, by using the receiving unit 33, the response message from the policy control network element.

Alternatively, the processing unit 31 is further configured to send the request message to a DHCP server by using the sending unit 32, and receive, by using the receiving unit 33, the response message from the DHCP server.

In a possible implementation, the request message includes the identifier of the terminal device and/or the first indication information.

In a possible implementation, the receiving unit 33 is configured to receive a configuration update message from a core network element, where the configuration update message is used to instruct to update the information about the configuration serving network element, and the configuration update message includes update information of the configuration serving network element. The sending unit 32 is further configured to send the configuration information update message to the terminal device.

In a possible implementation, the configuration update message further includes second indication information, where the second indication information is used to indicate an operation on the information about the configuration serving network element, and the operation includes any one of the following newly adding the information about the configuration serving network element, modifying the information about the configuration serving network element, and deleting the information about the configuration serving network element.

The communications apparatus provided in this embodiment of this application may perform the actions of the first core network element in the foregoing method embodiments. Implementation principles and technical effects thereof are similar, and details are not described herein again.

Figure 16:
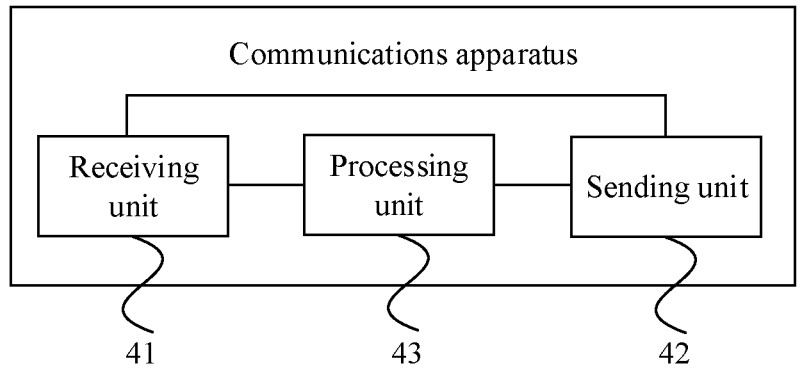
FIG. 16 is a schematic structural diagram of still another communications apparatus according to an embodiment of this application.

FIG. 16 is a schematic structural diagram of still another communications apparatus according to an embodiment of this application. The communications apparatus in this embodiment may be the foregoing network exposure network element (for example, an NEF network element), or a chip applied to the network exposure network element. The communications apparatus may be configured to perform actions of the network exposure network element in the foregoing method embodiments. As shown in FIG. 16, the communications apparatus may include a receiving unit 41 and a sending unit 42.

The receiving unit 41 is configured to receive a configuration request message from a configuration serving network element, where the configuration request message includes information about the configuration serving network element, and the information about the configuration serving network element includes address information of the configuration serving network element.

The sending unit 42 is configured to send the configuration request message to a core network element, where the core network element is any one of the following network elements a UDR network element, a data management network element, a policy control network element, and a DHCP server.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the configuration request message further includes an identifier of an operator to which the configuration serving network element belongs and/or an identifier of the configuration serving network element, and the apparatus further includes a processing unit 43. The processing unit 43 is configured to perform authentication on the configuration serving network element based on the identifier of the operator to which the configuration serving network element belongs and/or the identifier of the configuration serving network element, and the sending unit 42 is further configured to send the configuration request message to the core network element after the authentication on the configuration serving network element succeeds.

In a possible implementation, the information about the configuration serving network element further includes an identifier of a data network, where the data network is a network to which a session used by a terminal device to receive configuration information from the configuration serving network element belongs.

The communications apparatus provided in this embodiment of this application may perform the actions of the network exposure network element in the foregoing method embodiments. Implementation principles and technical effects thereof are similar, and details are not described herein again.

Figure 17:
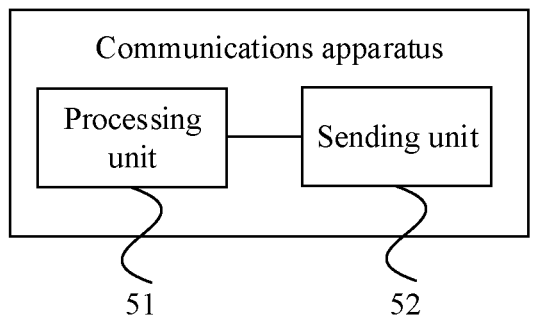
FIG. 17 is a schematic structural diagram of still another communications apparatus according to an embodiment of this application.

FIG. 17 is a schematic structural diagram of still another communications apparatus according to an embodiment of this application. The communications apparatus in this embodiment may be the foregoing configuration serving network element (for example, an ACS), or a chip applied to the configuration serving network element. The communications apparatus may be configured to perform actions of the configuration serving network element in the foregoing method embodiments. As shown in FIG. 17, the communications apparatus may include a processing unit 51 and a sending unit 52.

The processing unit 51 is configured to generate a configuration request message, where the configuration request message includes information about the configuration serving network element, and the information about the configuration serving network element includes address information of the configuration serving network element.

The sending unit 52 is configured to send the configuration request message to a network exposure network element.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In a possible implementation, the configuration request message further includes at least one of the following an identifier of an operator to which the configuration serving network element belongs and an identifier of the configuration serving network element.

In a possible implementation, the information about the configuration serving network element further includes an identifier of a data network, where the data network is a network to which a session used by a terminal device to receive configuration information from the configuration serving network element belongs.

The communications apparatus provided in this embodiment of this application may perform the actions of the configuration serving network element in the foregoing method embodiments. Implementation principles and technical effects thereof are similar, and details are not described herein again.

Figure 18:
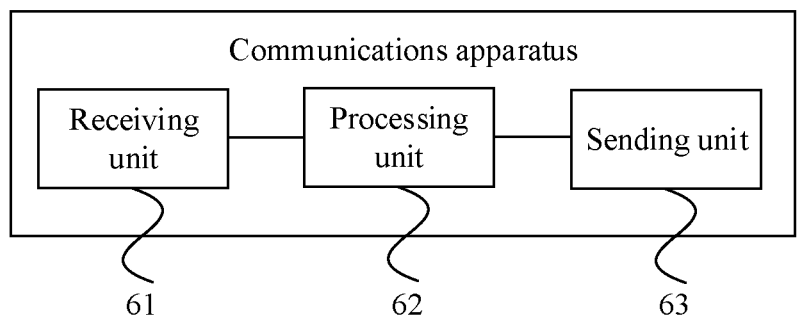
FIG. 18 is a schematic structural diagram of still another communications apparatus according to an embodiment of this application.

FIG. 18 is a schematic structural diagram of still another communications apparatus according to an embodiment of this application. The communications apparatus in this embodiment may be the foregoing core network element, or may be a chip applied to the core network element. The communications apparatus may be configured to perform actions of the core network element in the foregoing method embodiments. The core network element herein may be a configuration network element, for example, a UDR network element, a data management network element (for example, a UDM network element), a policy control network element (for example, a PCF network element), or a DHCP server, or a core network element connected to a configuration network element. As shown in FIG. 18, the communications apparatus may include a receiving unit 61 and a processing unit 62.

The receiving unit 61 is configured to receive a configuration request message from a network exposure network element or a UDR network element, where the configuration request message includes information about a configuration serving network element, and the information about the configuration serving network element includes address information of the configuration serving network element.

The processing unit 62 is configured to process the information about the configuration serving network element based on the configuration request message.

In a possible implementation, the processing unit 62 is further configured to store the information about the configuration serving network element based on the configuration request message.

In a possible implementation, the configuration request message further includes indication information, where the indication information is used to indicate an operation on the information about the configuration serving network element, and the operation includes any one of the following newly adding the information about the configuration serving network element, modifying the information about the configuration serving network element, and deleting the information about the configuration serving network element.

In this implementation, the apparatus further includes a sending unit 63. The processing unit 62 is further configured to send the configuration request message to a data management network element or a policy control network element by using the sending unit 63. Alternatively, the processing unit 62 is further configured to process the information about the configuration serving network element based on the indication information.

After processing the information about the configuration serving network element based on the indication information, the processing unit 62 may further send a configuration information update message to an access management network element by using the sending unit 63, where the configuration information update message is used to instruct to update the information about the configuration serving network element, and the configuration update message includes update information of the configuration serving network element. In a possible implementation, the configuration information update message further includes the indication information.

The communications apparatus provided in this embodiment of this application may perform actions of the configuration network element or the core network element connected to the configuration network element in the foregoing method embodiments. Implementation principles and technical effects thereof are similar, and details are not described herein again.

It should be noted that during actual implementation, the receiving unit may be a receiver, and the sending unit may be a transmitter. The processing unit may be implemented in a form of software invoked by a processing element, or may be implemented in a form of hardware. For example, the processing unit may be a separate processing element, or may be integrated into a chip of the foregoing apparatus for implementation. In addition, the processing unit may alternatively be stored in a memory of the foregoing apparatus in a form of program code, and a processing element of the foregoing apparatus invokes the program code and performs a function of the processing unit. In addition, all or some of the units may be integrated together, or may be implemented independently. The processing element herein may be an integrated circuit and has a signal processing capability. In an implementation process, the steps in the foregoing methods or the foregoing units can be implemented by using an integrated logical circuit in a form of hardware in the processing element, or by using instructions in a form of software.

For example, the foregoing units may be configured as one or more integrated circuits for implementing the foregoing methods, such as one or more application-specific integrated circuits (ASIC), one or more microprocessors, or one or more field-programmable gate arrays (FPGA). For another example, when a unit is implemented by scheduling program code by a processing element, the processing element may be a general-purpose processor, such as a central processing unit (CPU) or another processor that can invoke the program code. For another example, the units may be integrated together, and implemented in a form of a system-on-a-chip (SOC).

Figure 19:
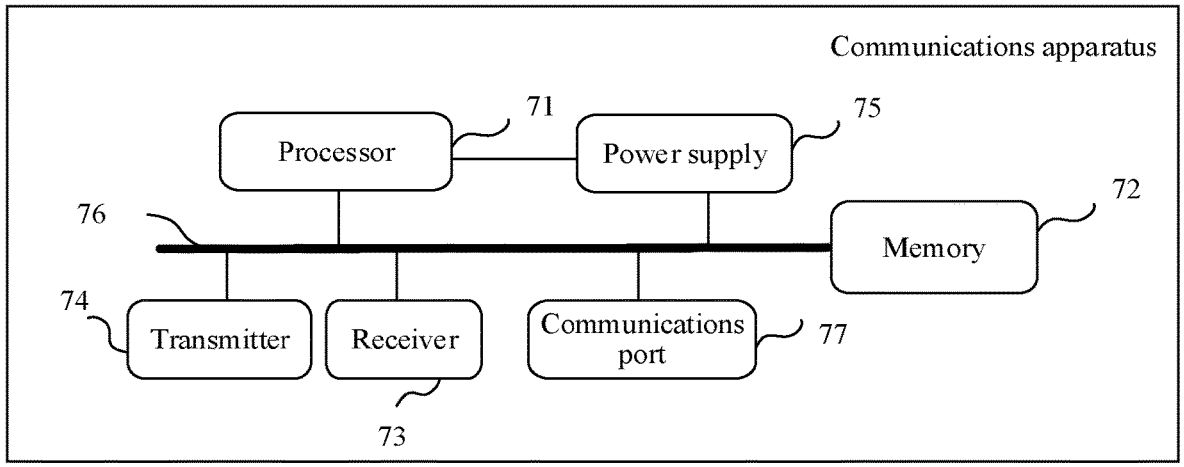
FIG. 19 is a schematic structural diagram of still another communications apparatus according to an embodiment of this application.

FIG. 19 is a schematic structural diagram of still another communications apparatus according to an embodiment of this application. As shown in FIG. 19, the communications apparatus may include a processor 71 (for example, a CPU), a memory 72, a receiver 73, and a transmitter 74. Both the receiver 73 and the transmitter 74 are coupled to the processor 71, and the processor 71 controls a receiving action of the receiver 73 and a sending action of the transmitter 74. The memory 72 may include a high-speed random-access memory (RAM), and may further include a non-volatile memory (NVM), for example, at least one magnetic disk storage. The memory 72 may store various instructions to complete various processing functions and implement the method steps in this application. Optionally, the communications apparatus in this application may further include a power supply 75, a communications bus 76, and a communications port 77. The receiver 73 and the transmitter 74 may be integrated into a transceiver of the communications apparatus, or may be independent receive antenna and transmit antenna on the communications apparatus. The communications bus 76 is configured to implement communication connection between the components. The communications port 77 is configured to implement connection and communication between the communications apparatus and another peripheral.

In this embodiment of this application, the memory 72 is configured to store computer-executable program code, where the program code includes an instruction. When the processor 71 executes the instruction, the instruction enables the processor 71 of the communications apparatus to perform a processing action of the terminal device in the foregoing method embodiments, enables the receiver 73 to perform a receiving action of the terminal device in the foregoing method embodiments, and enables the transmitter 74 to perform a sending action of the terminal device in the foregoing method embodiments. Implementation principles and technical effects thereof are similar, and details are not described herein again.

Figure 20:
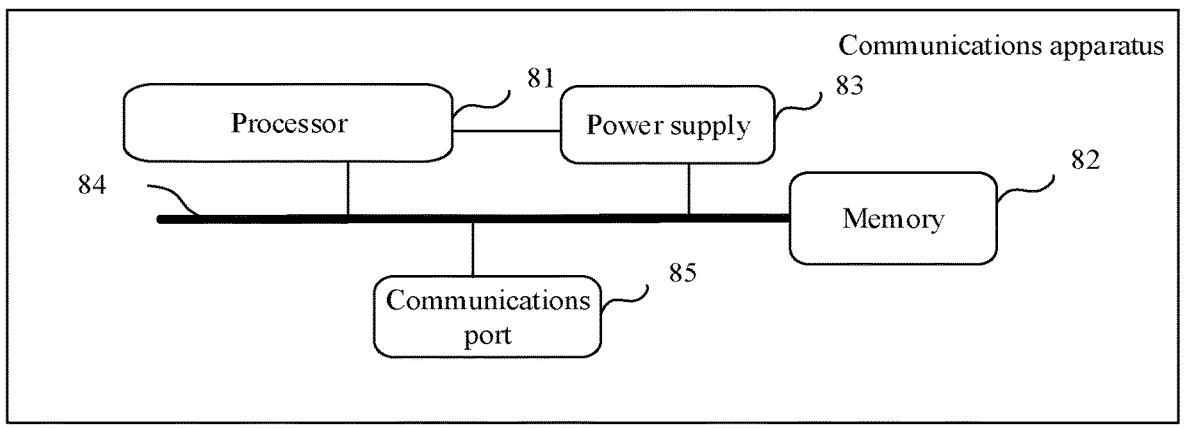
FIG. 20 is a schematic structural diagram of still another communications apparatus according to an embodiment of this application.

FIG. 20 is a schematic structural diagram of still another communications apparatus according to an embodiment of this application. As shown in FIG. 20, the communications apparatus may include a processor 81 (for example, a CPU) and a memory 82. The memory 82 may include a high-speed RAM, and may further include an NVM, for example, at least one magnetic disk storage. The memory 82 may store various instructions to complete various processing functions and implement the method steps in this application. Optionally, the communications apparatus in this application may further include a power supply 83, a communications bus 84, and a communications port 85. The communications bus 84 is configured to implement communication connection between the components. The communications port 85 is configured to implement connection and communication between the communications apparatus and another peripheral.

In this embodiment of this application, the memory 82 is configured to store computer-executable program code, where the program code includes an instruction. When the processor 81 executes the instruction, the instruction enables the processor 81 of the communications apparatus to perform an action of the core network element in the foregoing method embodiments. Implementation principles and technical effects thereof are similar, and details are not described herein again. The core network element herein may be a configuration network element, for example, a UDR network element, a data management network element (for example, a UDM network element), a policy control network element (for example, a PCF network element), or a DHCP server, or a core network element connected to a configuration network element.

Alternatively, when the processor 81 executes the instruction, the instruction enables the processor 81 of the communications apparatus to perform an action of the first core network element in the foregoing method embodiments. Implementation principles and technical effects thereof are similar, and details are not described herein again. The first core network element herein may be, for example, an access management network element (for example, an AMF network element) or a session management network element (for example, an SMF network element).

Alternatively, when the processor 81 executes the instruction, the instruction enables the processor 81 of the communications apparatus to perform an action of the network exposure network element (for example, an NEF network element) in the foregoing method embodiments. Implementation principles and technical effects thereof are similar, and details are not described herein again.

Alternatively, when the processor 81 executes the instruction, the instruction enables the processor 81 of the communications apparatus to perform an action of the configuration serving network element (for example, an ACS) in the foregoing method embodiments. Implementation principles and technical effects thereof are similar, and details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The term "a plurality of" in this specification means two or more than two. The term "and/or" in this specification describes only an association relationship between associated objects and represents that three relationships may exist. For example, A and/or B may represent the following three cases. Only A exists, both A and B exist, and only B exists. In addition, the character "/" in this specification generally indicates an "or" relationship between the associated objects. In the formula, the character "/" indicates a "division" relationship between the associated objects.

It should be understood that, various numerals in the embodiments of this application are merely used for distinguishing for ease of description, and are not intended to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A method, comprising:
    receiving, by a session management function network element, a first request message from a residential gateway, wherein the first request message comprises first indication information requesting to obtain address information of a configuration serving network element;
    sending, by the session management function network element, a second request message to a data management network element, wherein the second request message requests to obtain subscription data of the residential gateway;
    sending, by the data management network element, a first response message of the second request message to the session management function network element, wherein the first response message comprises the address information; and
    sending, by the session management function network element, a second response message to the residential gateway, wherein the second response message comprises the address information.

2. The method of claim 1, wherein the first indication information is an identifier of a data network corresponding to the configuration serving network element.

3. The method of claim 1, wherein the first request message is a session establishment request message, and wherein the second response message is a session establishment response message.

4. The method of claim 1, wherein the second request message comprises the first indication information.

5. The method of claim 1, wherein the first response message further comprises the subscription data of the residential gateway.

6. The method of claim 1, further comprising:
    receiving, by the data management network element, a configuration request message from a network exposure network element, wherein the configuration request message comprises the address information; and
    storing, by the data management network element, the address information.

7. The method of claim 1, further comprising sending, by the session management function network element, a configuration information update message to the residential gateway, wherein the configuration update message instructs the residential gateway to update the address information.

8. The method of claim 7, wherein the configuration update message comprises second indication information indicating an operation on the address information, and wherein the operation comprises one of: adding the address information, modifying the address information, or deleting the address information.

9. The method of claim 1, wherein the configuration serving network element is an auto-configuration server.

10. A system, comprising:
    a session management function network element configured to:
        receive a first request message from a residential gateway, wherein the first request message comprises first indication information requesting to obtain address information of a configuration serving network element; and
        send a second request message requesting to obtain subscription data of the residential gateway; and a data management network element coupled to the session management function network element and configured to:
- receive the second request message from the session management function network element; and
- send a first response message of the second request message to the session management function network element, wherein the first response message comprises the address information, wherein the session management function network element is further configured to send a second response message to the residential gateway, and wherein the second response message comprises the address information.

11. The system of claim 10, wherein the first indication information is an identifier of a data network corresponding to the configuration serving network element.

12. The system of claim 10, wherein the first request message is a session establishment request message, and wherein the second response message is a session establishment response message.

13. The system of claim 10, wherein the second request message comprises the first indication information.

14. The system of claim 10, wherein the first response message further comprises the subscription data of the residential gateway.

15. The system of claim 10, wherein the data management network element is further configured to:
- receive a configuration request message from a network exposure network element, wherein the configuration request message comprises the address information; and
- store the address information.

16. The system of claim 10, wherein the session management function network element is further configured to send a configuration information update message to the residential gateway, and wherein the configuration update message instructs to update the address information.

17. The system of claim 16, wherein the configuration update message comprises second indication information indicating an operation on the address information, and wherein the operation comprises one of: adding the address information, modifying the address information, or deleting the address information.

18. The system of claim 11, wherein the configuration serving network element is an auto-configuration server.

19. An apparatus, comprising:
- a processor; and
- a memory coupled to the processor and configured to store instructions that, when executed by the processor, cause the apparatus to be configured to:
  - receive a first request message from a residential gateway, wherein the first request message comprises first indication information indicating to obtain address information of a configuration serving network element;
  - send a second request message to a data management network element, wherein the second request message requests obtaining subscription data of the residential gateway;
  - receive a first response message of the second request message from the data management network element, wherein the first response message comprises the address information; and
  - send a second response message to the residential gateway, wherein the second response message comprises the address information.

20. The apparatus of claim 19, wherein the first indication information is an identifier of a data network corresponding to the configuration serving network element.

* * * * *